(12) United States Patent
Hoshi

(10) Patent No.: US 8,107,036 B2
(45) Date of Patent: Jan. 31, 2012

(54) BACKLIGHT DEVICE, LIQUID CRYSTAL DISPLAY APPARATUS, AND LIGHT DEFLECTING SHEET

(75) Inventor: Mitsunari Hoshi, Miyagi (JP)

(73) Assignee: Sony Corporation, Tokyo (JP)

( * ) Notice: Subject to any disclaimer, the term of this patent is extended or adjusted under 35 U.S.C. 154(b) by 413 days.

(21) Appl. No.: 11/910,432

(22) PCT Filed: Mar. 31, 2006

(86) PCT No.: PCT/JP2006/307414
§ 371 (c)(1),
(2), (4) Date: Mar. 19, 2009

(87) PCT Pub. No.: WO2006/107105
PCT Pub. Date: Oct. 12, 2006

(65) Prior Publication Data
US 2009/0237593 A1    Sep. 24, 2009

(30) Foreign Application Priority Data

Apr. 1, 2005  (JP) .................................. P2005-106522
Apr. 1, 2005  (JP) .................................. P2005-106525

(51) Int. Cl.
*G02F 1/1335*    (2006.01)
(52) U.S. Cl. ........................................................ 349/69
(58) Field of Classification Search .................. 349/64, 349/61
See application file for complete search history.

(56) References Cited

U.S. PATENT DOCUMENTS

| | | | |
|---|---|---|---|
| 7,063,430 B2 | 6/2006 | Greiner | |
| 7,252,428 B2 * | 8/2007 | Lee et al. | 362/628 |
| 7,556,417 B2 * | 7/2009 | Chang | 362/615 |
| 7,686,474 B2 * | 3/2010 | Chou et al. | 362/237 |
| 7,740,374 B2 * | 6/2010 | Chang | 362/240 |
| 2002/0097354 A1 | 7/2002 | Greiner | |

FOREIGN PATENT DOCUMENTS

JP    2002-324409    11/2002

OTHER PUBLICATIONS

International Search Report dated Jun. 30, 2006 (3 pages).
Japanese Office Action issued Aug. 2, 2011, for corresponding Japanese Appln. No. 2007-511262.

* cited by examiner

*Primary Examiner* — Sung Pak
(74) *Attorney, Agent, or Firm* — K&L Gates LLP

(57) ABSTRACT

According to the present invention, by controlling the angular distribution of the light outputted from a light guide plate to enable the angular brightness distribution of the light emitted from a backlight device to be controlled, the thickness of a liquid crystal display apparatus having the backlight device is reduced as well as the brightness is improved due to the reduction in returned light amount. Furthermore, since light is sufficiently mixed in the light guide plate, light sources with comparative large unevenness are enabled to be used.

A backlight device according to the present invention includes a hole or a projection formed on the light outgoing plane of a light guide plate or the back plane opposing the light-outgoing plane, and a side face of the hole or the projection is directed roughly perpendicularly to the light-outgoing plane. Furthermore, specular reflection plates are arranged on the bottom plane and the side faces of the light guide plate. The angular distribution of light from a light source is maintained due to the roughly perpendicular side face of the hole or the projection so that the light is led within the light guide plate and outputted outside.

20 Claims, 33 Drawing Sheets

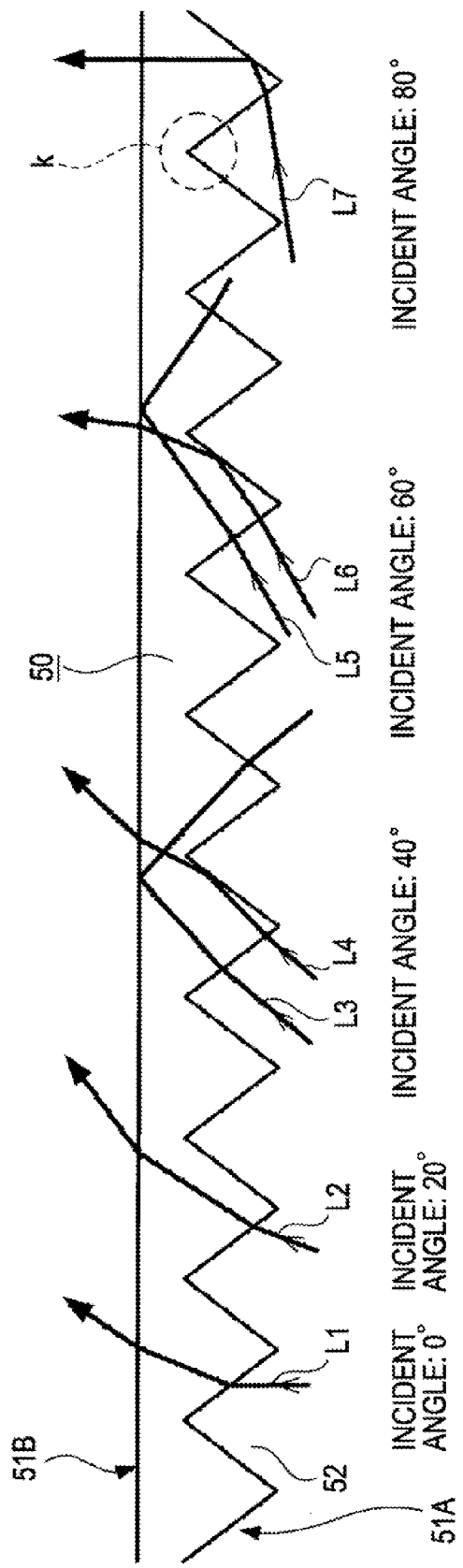

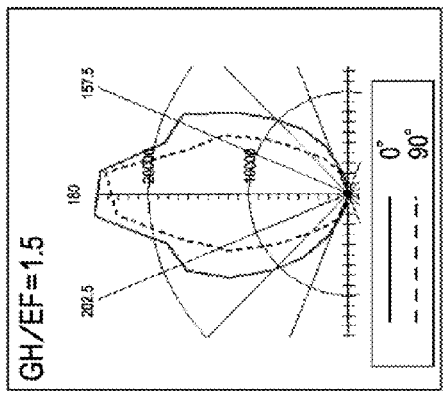
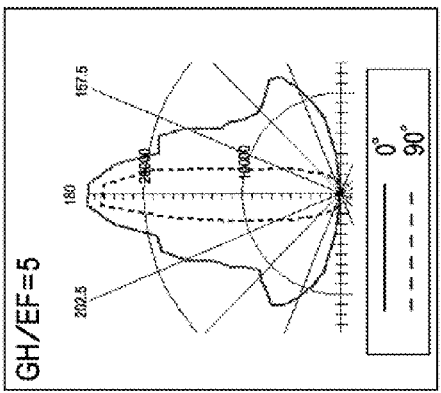
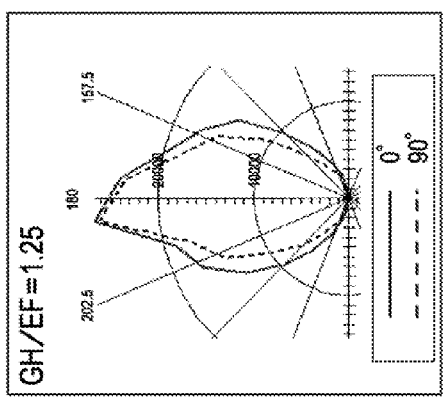
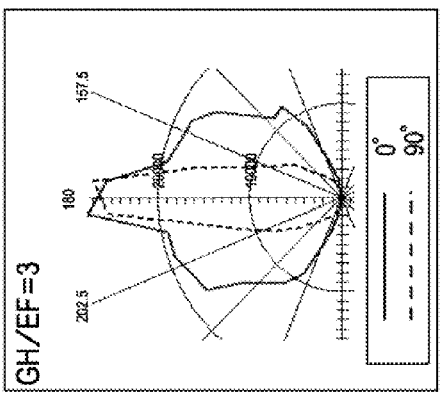
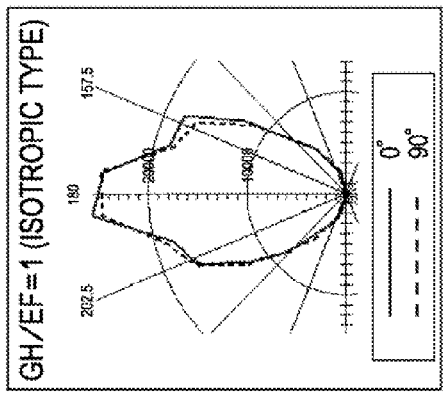
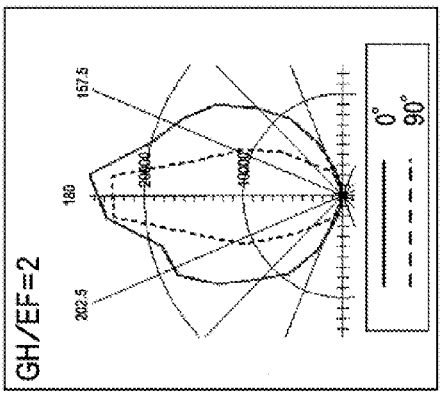

BACKLIGHT DEVICE, LIQUID CRYSTAL DISPLAY APPARATUS, AND LIGHT DEFLECTING SHEET

CROSS REFERENCE TO RELATED APPLICATIONS

The present application claims priority to Japanese Patent Document Nos. P2005-106525 filed on Apr. 1, 2005 and P2005-106522 filed on Apr. 1, 2005, the disclosures of which are herein incorporated by reference.

BACKGROUND

The present invention relates to a backlight device, a liquid crystal display apparatus, and a light deflecting sheet suitably applicable to a light source of the liquid crystal display apparatus and a room lighting system, for example.

Recently, displays highly reduced in thickness, such as an LCD (liquid crystal display) and a PDP (plasma display panel), have been proposed for a display of a television receiver instead of a CRT (cathode ray tube), and have been put into practical use. In particular, the liquid crystal display including a liquid crystal display panel has become widespread following the driving with low electrical power consumption and reduction in price of a large-sized liquid crystal display panel, and has been pushed ahead with research and development.

In such a liquid crystal display, a backlight system is the mainstreamer in that color images are displayed by two-dimensionally illuminating a transmission liquid crystal display panel having a color filter from the rear.

As the light source of the backlight system, a cold cathode fluorescent lamp (CCFL) radiating white light by using a fluorescent lamp and a light emitting diode (LED) are regarded as promising (see Patent Document 1, for example).

In particular, by the development of a blue-color LED, LEDs respectively irradiating red-color light, green-color light, and blue-color light, which are three primary colors, appear all together, so that white light with high chromatic purity can be obtained by mixing the red-color light, the green-color light, and the blue-color light emitted from these LEDs. Thus, using these LEDs as the light source of the backlight device increases the chromatic purity of light has passed the liquid crystal display panel, thereby widely spreading a color reproduction range in comparison with the CCFL. Furthermore, using a light emitting diode (LED) chip with high output power largely improves the brightness of the backlight device.

When using LEDs of the three primary colors (the red-color light, the green-color light, and the blue-color light) in the light source of such a backlight device, if the LEDs are arranged directly below a light emitting plane, i.e., they are a directly under type of diode, brightness non-uniformity and color non-uniformity may be liable to generate because the LED is a point light source.

Means for achieving this problem may include increasing the distance between the LED and a diffusion plate; however, the thickness of the backlight device becomes very large in comparison with that including the CCFL. In the liquid crystal display, the further reduction in weight and thickness is essential so that the backlight device also requires further reducing its thickness.

Then, a method for reducing the thickness is proposed in that by a light guide plate, light from the light source arranged on one side of the light guide plate is multipath-reflected to form a surface light source.

In a side-light type structure of the backlight device including the light guide plate, in which a number of light sources are arranged on one side of the light guide plate for increasing the brightness, a structure is proposed in that a concave structure having a triangular cross-section is formed on the bottom surface of the light guide plate opposite to the light outgoing part (see Patent Document 2, for example).

In order to uniformize the in-plane distribution of the brightness, various technical contrivances are proposed in shapes and arrangements of the diffusing plate and a prism sheet, for example. The prism sheet generally used widely at present may include BEF™ from Sumitomo 3M Limited and DIAART™ from MITSUBISHI RAYON Co., LTD. The former prism sheet, as shown in the perspective view of FIG. 47 as an example, is a light deflecting sheet 150 having a triangular-pole concavo-convex shaped plane continuously formed on one surface, and it has a function to deflect incident light incident from various directions to within a predetermined emitting-direction range.

The schematic exploded perspective view of a side-light type backlight device including the above-mentioned DIAART™ from MITSUBISHI RAYON Co., LTD is shown in FIG. 48. In this case, a structure is proposed in that on the light incident side, a light deflecting sheet 150 having a triangular-pole grooved plane is arranged to oppose the upper surface 130A, which is a light outgoing plane, of a light guide plate 130, and on the bottom surface 130B opposite to the upper surface 130A of the light guide plate 130, grooves are formed in a direction perpendicular to the extending direction of the triangular-pole prism plane of the light deflecting sheet 150. In such a configuration, light emitted from a light source 121 is reflected by a reflector 135 to enter a side 130s of the light guide plate 130, so that the light outputted therefrom is caused to enter a liquid crystal display panel 136 with desired angular distribution by the grooves formed on the bottom surface 130B of the light guide plate 130; a reflection plate 132 arranged to oppose the bottom surface 130B; and further by the light deflecting sheet 150 (see Patent Document 3, for example).

[Patent Document 1] Japanese Unexamined Patent Application Publication No. 8-136917
[Patent Document 2] Japanese Unexamined Patent Application Publication No. 6-3526
[Patent Document 3] Japanese Unexamined Patent Application Publication No. 11-224516

SUMMARY

In the backlight device including LEDs, the three primary color LEDs especially, as mentioned above, it is important how to increase the brightness while uniformizing the in-plane distribution of the brightness, i.e., uniformizing the color mixture and optical power distribution.

In order to uniformize the in-plane distribution of the brightness, the diffusing plate and the prism sheet have been conventionally used. The diffusing plate outputs incident light by diffusing it; however, at this time, about the half of the light is not outputted forwardly to return rearward. When using the prism sheet, such as the BEF mentioned above, if the light incident to this prism sheet from the light source has wide angular distribution, the light incident at an angle not adapting to the shape of the prism sheet is rearward returned. The returned light is recycled; however, part of it is lost due to the reflection by the reflection sheet to generate heat. Namely, in the conventional configuration, there is a problem that the returned light due to the diffusing plate and the prism sheet is much so that loses due to reflection by the reflection plate are plenty, leading to the insufficient brightness.

Furthermore, in medium- and large-sized backlight devices, since a number of LEDs are used, if there are uneven emission wavelengths and light flux amounts in the respective LEDs, the brightness non-uniformity and the color non-uniformity are to be produced. Hence, the action such as increasing the thickness of the diffusing plate is needed, so that the problem of reduced brightness arises.

In the configuration disclosed in the Patent Document 2, when light from the light source enters the inside of the light guide plate, part of the light is reflected by the boundary so as to have a loss.

In the above-mentioned side-light structure, when LEDs are used for the light source, if a number of the LEDs are not arranged on the side of the light guide plate, the irregular light level of the light source is generated in the vicinity of the side, so that the effective region available for the backlight becomes reduced in size. On the other hand, there are also problems of difficulties in increasing sizes because of the limit of the number of the light sources, and in radiating heat because the light sources are concentrated on one position. When the light source is the LED, the luminous efficiency is reduced at high temperature, so that it is important to secure radiating characteristics. In the side-light configuration, the number and the density of the LED light sources may be limited.

In view of the above problems, it is an object of the present invention to improve the efficiency for light utilization by controlling angular distribution of the light outputted outside from a light guide plate so as to control the angular distribution of the light emitted from the backlight device for reducing the returned light amount.

In order to solve the problems described above, a backlight device according to the present invention includes a light guide plate and at least one light source so that light is outputted outside from a light-outgoing plane of the light guide plate, in which the light guide plate includes a hole or a projection formed on the light-outgoing plane or the back plane opposing the light-outgoing plane, and a side face of the hole or the projection is directed roughly perpendicularly to the light-outgoing plane or the back plane.

According to the present invention, the backlight device may further include a light deflecting sheet arranged on the light-outgoing plane of the light guide plate, in which the light deflecting sheet may output incident light having a specific angular distribution, with the angular brightness distribution including a peak in a specific direction relative to the light-outgoing plane of the light deflecting sheet.

Furthermore, a liquid crystal display apparatus according to the present invention includes a transmission liquid crystal display panel and a backlight device for illuminating the liquid crystal display panel from the back side, in which the backlight device includes a light guide plate and a light source assembled in the light guide plate, and the light guide plate is provided with a hole or a projection formed on a light-outgoing plane of the light guide plate or the back plane opposing the light-outgoing plane, and a side face of the hole or the projection is roughly perpendicular to the light-outgoing plane or the back plane.

The liquid crystal display apparatus according to the present invention may further include a light deflecting sheet provided on the light outgoing plane of the light guide plate, in which the light deflecting sheet may output incident light having a specific angular distribution with angular brightness distribution having a peak in a specific direction, the roughly perpendicular direction, for example.

Furthermore, in a light deflecting sheet arranged on a light outgoing plane of a light guide plate, the light deflecting sheet according to the present invention mixes light from a light source so as to derive the light outside, and includes pyramidal concave structures or concave structures with two triangular inclines and two trapezoidal inclines, the concave structures being juxtaposed at least on the light-outgoing plane.

As described above, in the backlight device according to the present invention, the light guide plate includes a hole or a projection formed on the light outgoing plane or the back plane opposing the light-outgoing plane, and a side face of the hole or the projection is directed roughly perpendicularly to the light-outgoing plane or the back plane.

Since such a side face directed roughly perpendicularly to the light-outgoing plane or the back plane maintains the reflection angle of the light led to within the light guide plate, the ratio of the light led to within the light guide plate can be increased; when the light source includes a specific angular distribution, the light substantially maintains its angular distribution so as to be outputted from the light guide plate.

By arranging the light deflecting sheet according to the present invention that outputs incident light having a specific angular distribution with angular brightness distribution having a peak in a specific direction, when the light outputted from the light guide plate maintaining the angular distribution of the light from the light source passes through the light deflecting sheet, the light is outputted with the angular brightness distribution having a peak in a desired direction to the light-outgoing plane, the perpendicular direction thereto, for example. Namely, the light is outputted with the angular brightness distribution suitable for the liquid crystal display apparatus.

Also, by controlling the angular distribution of the light outputted from the light guide plate, the returned light amount from the light deflecting sheet is reduced so as to improve the brightness.

Furthermore, since the light is sufficiently mixed in the light guide plate, when the LED is used for the light source, even if the comparative large unevenness is generated in individual LED, the brightness non-uniformity can be suppressed. When a multi-color light source is used, non-uniformity in chromaticity can be suppressed.

Additional features and advantages of the present invention are described in, and will be apparent from, the following Detailed Description and the Figures.

BRIEF DESCRIPTION OF THE FIGURES

FIG. 31 is an exemplary view for illustrating the incident light and the emitting angle in the light deflecting sheet according to the embodiment of the present invention.

FIGS. 44A to 44F are drawings showing the angular brightness distribution of a light deflecting sheet according to an embodiment of the present invention.

Figure 1:
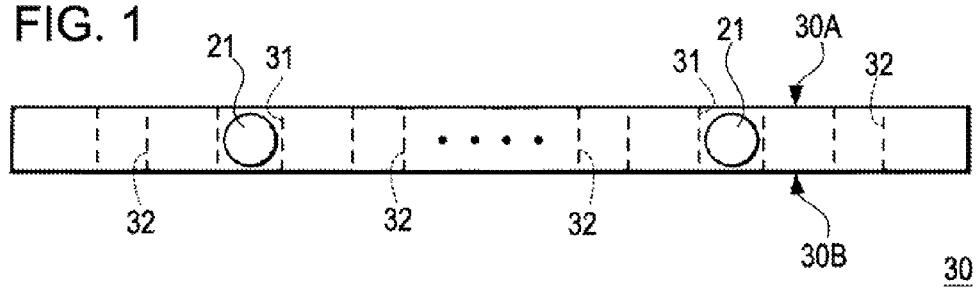
FIG. 1 is a schematic sectional structural drawing of a light guide plate of a backlight device according to an embodiment of the present invention.

REFERENCE NUMERALS 1a first substrate
1b second substrate
2a TFT (thin film transistor)
2b pixel electrode
2c gate bus line
2d source bus line
3 color filter
4 common electrode
5 liquid crystal
6, 7 polarizing plate
10 backlight device
11 liquid crystal display panel
12 liquid crystal display apparatus
21 light source
22 reflection structure
23 wiring board
24 casing
25 spacer
26 diverter sheet
27 diffusing plate
28 diffusing sheet
30 light guide plate
31 light-source opening
32 hole
33 projection
40 light deflecting sheet
41 concave structure
50 light deflecting sheet
51 concave structure
51A plane
51B back plane
61 triangular concave structure
62 triangular projection

DETAILED DESCRIPTION

A best mode for carrying out the invention will be described; however, the present invention is not limited to embodiments below. Preferred embodiments of a backlight device according to the present invention incorporating a light source of a liquid crystal display apparatus having a transmission liquid crystal display panel are shown below; the backlight device according to the present invention is not limited to the embodiments below; alternatively, it may be applied to a surface light-source illumination apparatus provided on the entire ceiling surface as a room illumination. In this case, a white LED may be used for the light source.

First, a light guide plate of the backlight device according to a best mode for carrying out the invention is shown in schematic fundamental structural drawings of FIGS. 1 to 5.

In the example shown in FIG. 1, a light guide plate 30 is provided with a light-source opening 31 for accommodating a light source 21 and a hole 32 penetrating the light guide plate 30. The hole 32 may have a cylindrical shape or a prism shape (including columnar shapes with polygonal sections, which are a pentagonal section and more multi-angular sections than the pentagonal section, in addition to a quadrangular prism shape) having a plane perpendicular to a light-outgoing plane 30A and a back plane 30B opposing the light-outgoing plane 30A.

The shape of the light-source opening 31 may include a shape penetrating the light guide plate 30 as shown in the drawings as well as a concave shape opened from the back plane 30B of the light guide plate 30. In the case providing such a concave light-source opening 31, the light source 21 is arranged within the opening so as to assemble the light source 21 in the light guide plate 30.

In the plane arrangement of the light-source openings 31, the openings lie in an array at equal intervals, and in the light-source opening 31 of each array, the light sources 21, including R (red) LED, G (green) LED, and B (blue) LED, are arranged in that order, for example, so as to incorporate the light source 21 into the light guide plate 30. FIG. 1 shows one section on which the light sources 21 with each LED are juxtaposed, and the same LED array is provided in a direction perpendicular to the plane of FIG. 1, so that the LED light sources 21 are two-dimensionally juxtaposed as a whole to form a surface light source.

The holes 32 are arranged at roughly equal intervals, each being arranged between the light-source openings 31. The number of the holes 32 may be about the same as that of the light-source openings 31, alternatively, it may be different therefrom. It is desirable that the position relative to the light-source opening 31, the shape, the size, and the number of the holes 32 be appropriately selected in accordance with the conditions, such as the kind, characteristics, the arrangement, and the number of the light sources 21, and the target conditions of the backlight device.

Under certain circumstances, without the hole 32, the light-source opening 31 may also have its effect. That is, when the light-source opening 31 has a side face roughly perpendicular to the light-outgoing plane 30A and the back plane 30B, it may have the same effect as the hole 32 or a projection 33. Similarly, when the light guide plate 30 is provided with a concave hole opened from the back plane 30B so as to form the light-source opening 31, the light-source opening 31 may have the same function as that of the hole 32.

The material of the light guide plate 30 may include a transparent and colorless resin with optical transparency at the wavelength band width in use, such as an acrylic resin.

Although not shown, it is preferable that the light guide plate 30 be provided with a reflection structure made of a specular reflection member, such as a reflection sheet, arranged on the back plane 30B and the side face other than the light-outgoing plane 30A. By providing the specular reflection material on a surface other than the light-outgoing plane 30A, the reflection angle can be maintained on this surface.

The light guide plate 30 may also be provided, on the light-outgoing plane 30A, with a light deflecting sheet, which will be described later, and a polarization conversion sheet functioning to decompose incident light into polarized components perpendicular to each other, if necessary.

The radiating angular distribution of the light emitted from the LED light source can be adjusted by a lens of the LED. In particular, when using a side-emitting type LED in that light is emitted toward the side face of the LED, the light can be led to over wide region within the light guide plate 30.

In the side-emitting type LED, although the detail is omitted, respective luminous bodies, such as light emitting devices, are held by a resin holder and a pair of terminals are protruded from the resin holder. Each light emitting diode is provided with an optical member for radiating the light emitted from a light source from the side face so as to have the directivity radiating the main component of the emitted light in the circumferential direction of the luminous body. The side-emitting type LED is disclosed in Japanese Unexamined Patent Application Publications No. 2003-8068 and No. 2004-133391, for example.

In the side-emitting type LED, although the detail is omitted, when the luminous bodies, such as light emitting devices, are configured as above, the light emitted from the light source 21 enters the inside of the light guide plate 30 from the light-source opening 31 so that the light is fundamentally guided within the light guide plate 30 by repeating the total reflection at the interface with air layers existing above and below the light guide plate 30. When the guided light enters the hole 32, it may enter the inside of the light guide plate 30 again or it may be outputted outside the light guide plate 30. The light incident within the light guide plate 30 again is to be outputted outside the light guide plate 30 from the hole 32 after repeating the total reflection. The important point herein is that the light outputted from the light guide plate 30 maintains the angular distribution of the light source 21 because the light-source opening 31 and the hole 32 have side faces roughly perpendicular to the light-outgoing plane 30A of the light guide plate 30. When the projection is provided, by having the side face roughly perpendicular thereto in the same way, the angular distribution of the light source 21 can also be maintained. For maintaining the angular distribution of the light source 21, the side face of the hole 32 or the projection is directed to the light-outgoing plane 30A at an angle below 90°±10°, preferably at an angle below 90°±5°, and more preferably at an angle below 90°±3°. When the light guide plate 30 is formed by injection molding, the margin of the draft is about 1 to 2°, so that the side face of the hole or projection can be formed within a sufficiently desired accuracy range.

Figure 2:
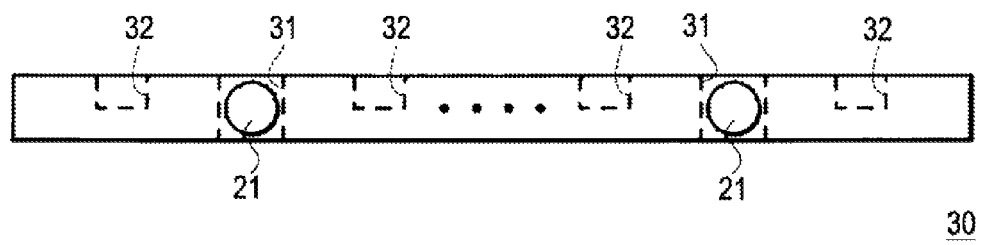
FIG. 2 is a schematic sectional structural drawing of a light guide plate of a backlight device according to an embodiment of the present invention.
Figure 3:
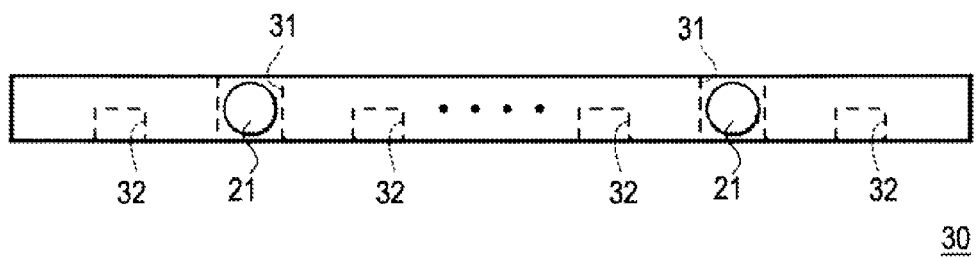
FIG. 3 is a schematic sectional structural drawing of a light guide plate of a backlight device according to an embodiment of the present invention.
Figure 4:
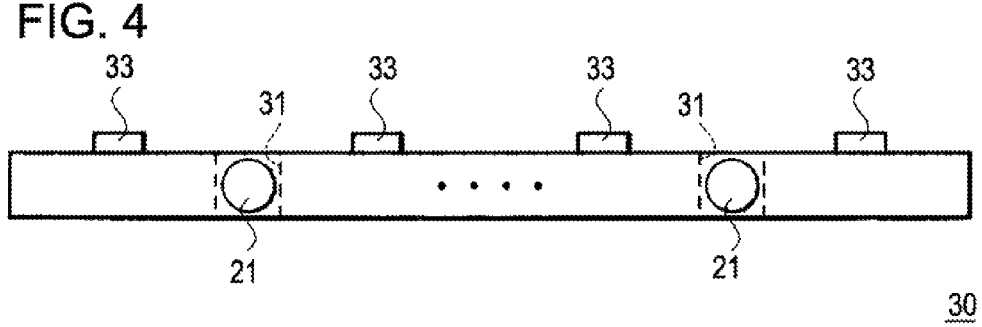
FIG. 4 is a schematic sectional structural drawing of a light guide plate of a backlight device according to an embodiment of the present invention.
Figure 5:
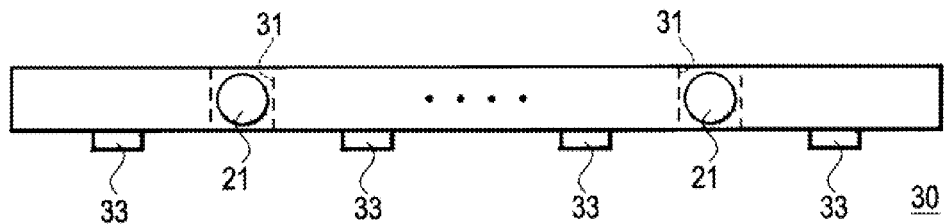
FIG. 5 is a schematic sectional structural drawing of a light guide plate of a backlight device according to an embodiment of the present invention.

According to the present invention, other than the example shown in FIG. 1, as shown in FIGS. 2 and 3, the light guide plate 30 may also be provided with concave holes 32, which do not penetrate the light guide plate 30 and are formed on the light-outgoing plane 30A and the back plane 30B. Furthermore, as shown in FIGS. 4 and 5, the light guide plate 30 may also be provided with a projection 33 formed on the light-outgoing plane 30A or the back plane 30B. These hole 32 and projection 33 may have various shapes, such as cylindrical and prism shapes, having a side face roughly perpendicular to the light-outgoing plane 30A and the back plane 30B, in the same way as the hole 32 shown in FIG. 1. In FIGS. 2 and 3, like reference characters designate like portions corresponding to those in FIG. 1 and the description thereof will be omitted for avoiding duplication.

Figure 6A:
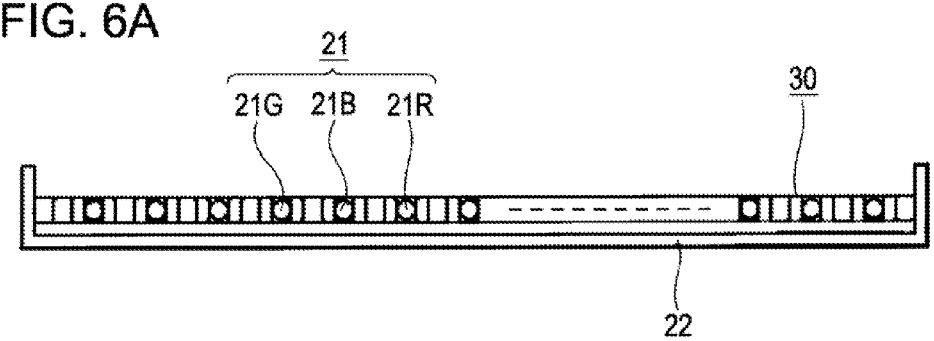
FIG. 6A is a schematic sectional structural drawing of a backlight device according to an embodiment of the present invention and a comparative example.

Next, the angular brightness distribution of light outputted from the light guide plate 30 configured as above will be shown as the results analyzed by ray tracing. In each example, as shown in FIG. 6A, the light guide plate 30 is provided with the light source 21 composed of the above-mentioned side-emitting type LEDs (red LED 21R, green LED 21G, and blue LED 21B) and arranged within the cylindrical light-source opening 31 penetrating the light guide plate 30; and a reflection structure 22 composed of a specular reflection sheet and arranged on the back plane 30B and the side face other than the light-outgoing plane 30A. Wherein, the material of the light guide plate 30 is polymethylmethacrylate (PMMA); the thickness of the light guide plate 30 is 10 mm; and the depth or the height of the concave hole 32 and the projection 33 is 0.5 mm.

Figure 6B:
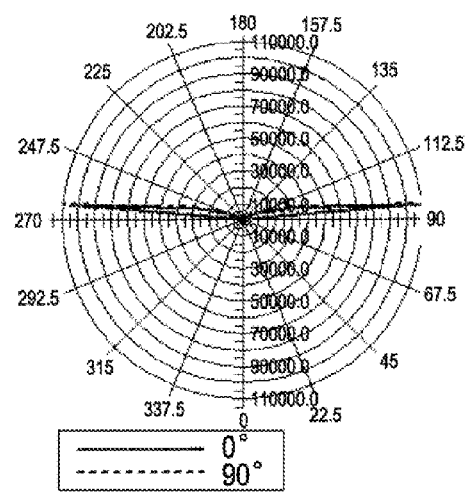
FIG. 6B is a drawing showing an angular brightness distribution of a light source.

The angular brightness distribution of the radiant light emitted from the light source 21 is shown in FIG. 6B. In the drawings below of the angular brightness distribution, the solid line designates the angular brightness distribution in the horizontal direction (the lateral direction, 0°) when the surface of the light guide plate is viewed; and the broken line designates the angular brightness distribution in the perpendicular direction (the vertical direction, 90°). Namely, it is understood that in both the horizontal and perpendicular directions, the distribution is the side-emitting type having a strong brightness peak in a direction at 80° from the direction perpendicular to the light outgoing plane.

Figure 7A:
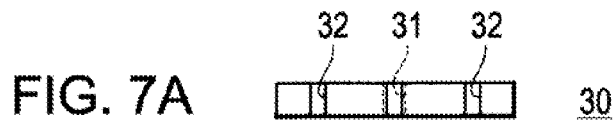
FIG. 7A is a schematic sectional structural drawing of a light guide plate of a backlight device according to an embodiment of the present invention.
Figure 7B:
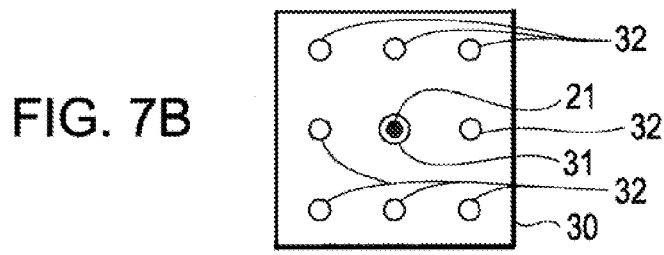
FIG. 7B is a schematic plan structural drawing of the light guide plate of the backlight device according to the embodiment of the present invention.
Figure 7C:
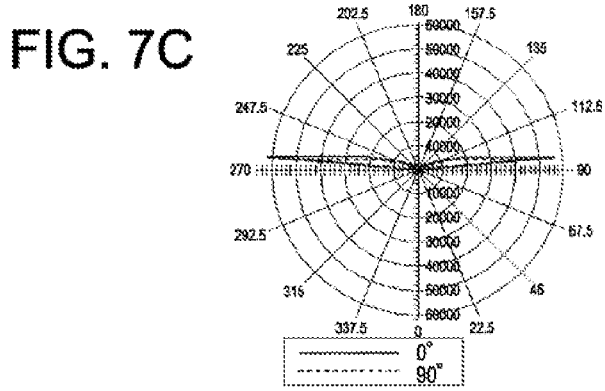
FIG. 7C is a drawing showing an angular brightness distribution of the backlight device according to the embodiment of the present invention.

FIGS. 7A and 7B are schematic sectional and plan structural drawings, respectively, when the hole 32 has a cylindrical shape penetrating the light guide plate 30 in the same way as in the above description of FIG. 1. The holes 32, as shown in FIG. 7B, are arranged to form a rectangle at roughly equal intervals around the light-source opening 31. At this time, in the angular brightness distribution of the light outputted from the light guide plate 30, as shown in FIG. 7C, it is understood that the distribution maintains the angular brightness distribution of the light source 21 so as to have a brightness peak in a direction of about 80°.

Figure 8A:
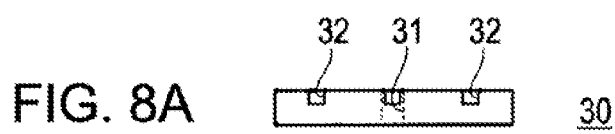
FIG. 8A is a schematic sectional structural drawing of a light guide plate of a backlight device according to an embodiment of the present invention.
Figure 8B:
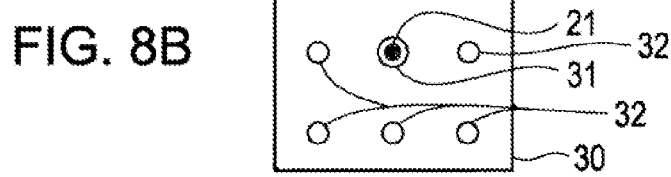
FIG. 8B is a schematic plan structural drawing of the light guide plate of the backlight device according to the embodiment of the present invention.
Figure 8C:
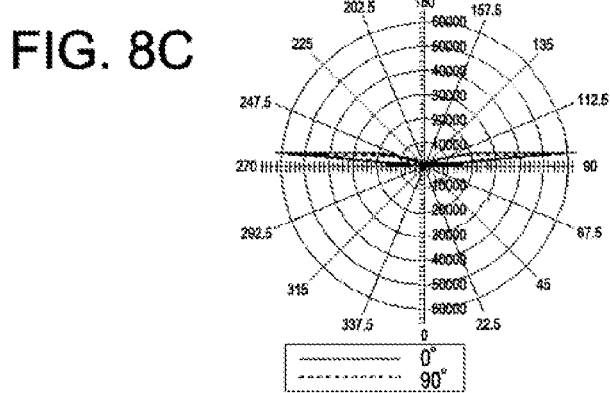
FIG. 8C is a drawing showing an angular brightness distribution of the backlight device according to the embodiment of the present invention.

FIGS. 8A and 8B are schematic sectional and plan structural drawings, respectively, when the hole 32 has a cylindrical and concave shape opened from the light-outgoing plane 30A of the light guide plate 30 in the same way as in the above description of FIG. 2. The holes 32, as shown in FIG. 8B, are arranged to form a rectangle at roughly equal intervals around the light-source opening 31. At this time, in the angular brightness distribution of the light outputted from the light guide plate 30, as shown in FIG. 8C, it is also understood that the distribution maintains the angular brightness distribution of the light source 21 so as to have a brightness peak in a direction of about 80°.

Figure 9A:
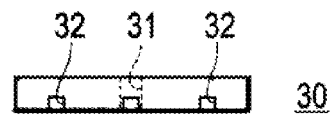
FIG. 9A is a schematic sectional structural drawing of a light guide plate of a backlight device according to the embodiment of the present invention.
Figure 9B:
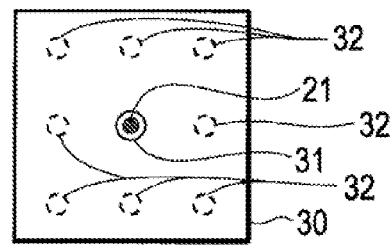
FIG. 9B is a schematic plan structural drawing of the light guide plate of the backlight device according to the embodiment of the present invention.
Figure 9C:
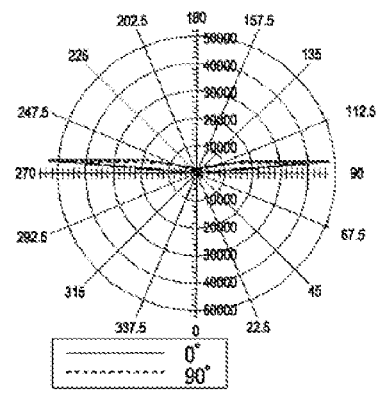
FIG. 9C is a drawing showing an angular brightness distribution of the backlight device according to the embodiment of the present invention.

FIGS. 9A and 9B are schematic sectional and plan structural drawings, respectively, when the hole 32 has a cylindrical and concave shape opened from the back plane 30B of the light guide plate 30 in the same way as in the above description of FIG. 3. The holes 32, as shown in FIG. 9B, are arranged to form a rectangle at roughly equal intervals around the light-source opening 31. At this time, in the angular brightness distribution of the light outputted from the light guide plate 30, as shown in FIG. 9C, it is also understood that the distribution maintains the angular brightness distribution of the light source 21 so as to have a brightness peak in a direction of about 80°.

Figure 10A:
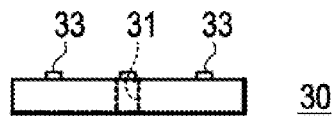
FIG. 10A is a schematic sectional structural drawing of a light guide plate of a backlight device according to an embodiment of the present invention.
Figure 10B:
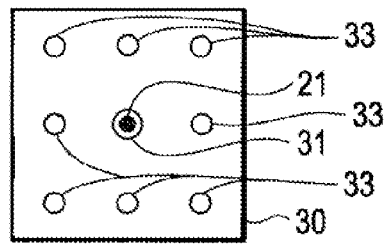
FIG. 10B is a schematic plan structural drawing of the light guide plate of the backlight device according to the embodiment of the present invention.
Figure 10C:
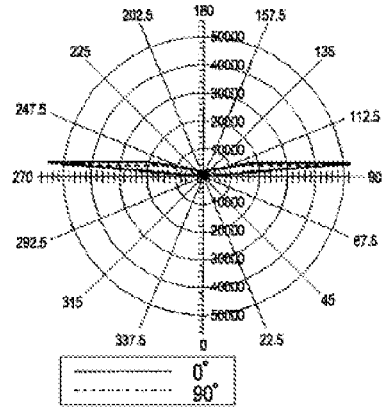
FIG. 10C is a drawing showing an angular brightness distribution of the backlight device according to the embodiment of the present invention.

FIGS. 10A and 10B are schematic sectional and plan structural drawings, respectively, when the cylindrical projection 33 is formed on the light-outgoing plane 30A of the light guide plate 30 in the same way as in the above description of FIG. 4. The projections 33, as shown in FIG. 10B, are arranged to form a rectangle at roughly equal intervals around the light-source opening 31. At this time, in the angular brightness distribution of the light outputted from the light guide plate 30, as shown in FIG. 10C, it is also understood that the distribution maintains the angular brightness distribution of the light source 21 so as to have a brightness peak in a direction of about 80°.

In comparison with when the through-hole is provided, when small holes or projections are provided in the resin light guide plate by injection molding, for example, this method has the advantages of easy manufacturing, easy increasing the area, and easy reducing the tact time, because of the flowability of the molten material.

Figure 11A:
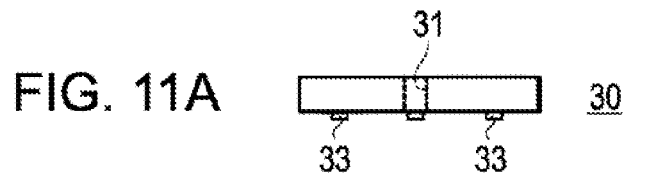
FIG. 11A is a schematic sectional structural drawing of a light guide plate of the backlight device according to an embodiment of the present invention.
Figure 11B:
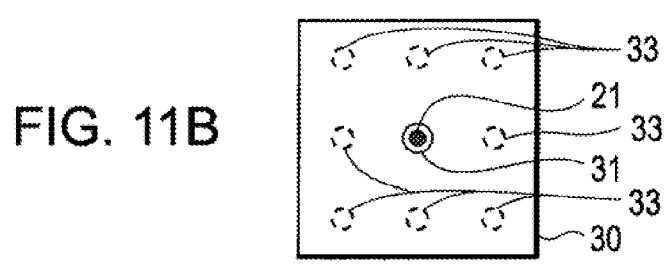
FIG. 11B is a schematic plan structural drawing of the light guide plate of the backlight device according to the embodiment of the present invention.
Figure 11C:
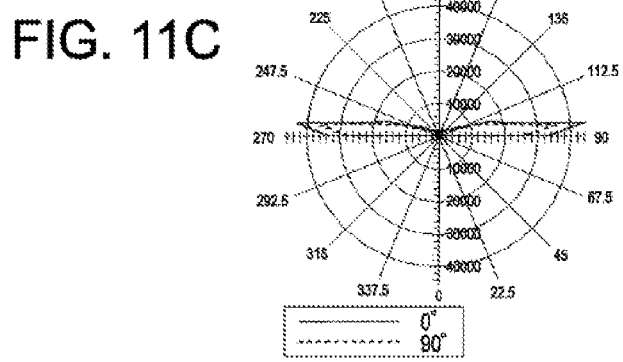
FIG. 11C is a drawing showing an angular brightness distribution of the backlight device according to the embodiment of the present invention.

FIGS. 11A and 11B are schematic sectional and plan structural drawings, respectively, when the cylindrical projection 33 is formed on the back plane 30B of the light guide plate 30 in the same way as in the above description of FIG. 5. The projections 33, as shown in FIG. 11B, are arranged to form a rectangle at equal intervals around the light-source opening 31. At this time, in the angular brightness distribution of the light outputted from the light guide plate 30, as shown in FIG. 1C, it is also understood that the distribution maintains the angular brightness distribution of the light source 21 so as to have a brightness peak in a direction of about 80°.

When the projection 33 is provided on the back plane 30B in such a manner, the light outputted from the projection 33 is irradiated in the front direction after being reflected by a specular reflection plate on the back side, so that the light from the three-color light source 21 can be easily mixed. Accordingly, the illumination apparatus, such as liquid crystal display apparatus, including such a light guide plate 30 has the advantage of capability in reducing the thickness between the reflection plate and liquid crystal display panel.

Whereas, on the structure as proposed in the above Patent Document 2, in which a concave structure with a triangular cross-section is provided, the angular brightness distribution has also been analyzed in the same way.

Figure 12A:
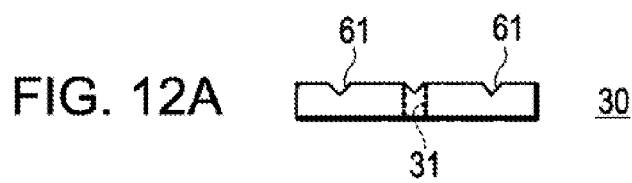
FIG. 12A is a schematic sectional structural drawing of a light guide plate of a backlight device according to a comparative example.
Figure 12B:
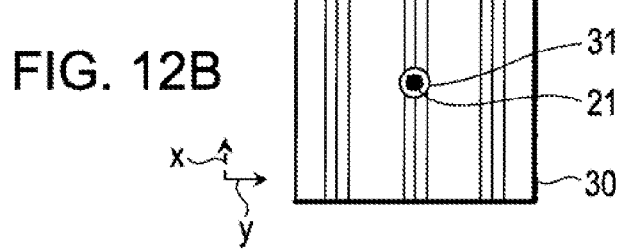
FIG. 12B is a schematic plan structural drawing of the light guide plate of the backlight device according to the comparative example.
Figure 12C:
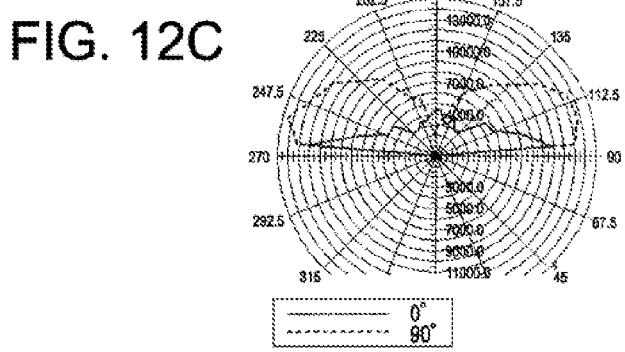
FIG. 12C is a drawing showing an angular brightness distribution of the backlight device according to the comparative example.

First, as shown in FIG. 12A, the light guide plate 30 is provided with triangular concave structures 61 formed on the light-outgoing plane 30A of the light guide plate 30, which extend in a direction perpendicular to the plane of FIG. 12A, so as to arrange the triangular concave structures 61 in the horizontal direction to the light-source opening 31 at equal intervals as shown in FIG. 12B. In FIG. 12B, the broken-line arrow x designates the horizontal direction and the solid-line arrow y designates the perpendicular direction. The other configurations are the same as those of the above examples shown in FIGS. 7 to 11. In this case, the angular brightness distribution of the light outputted from the light guide plate 30, as shown in FIG. 12C, does not maintain the angular brightness distribution of the light source 21 as well as the angular brightness distribution in the horizontal direction is different from that in the perpendicular direction.

Figure 13A:
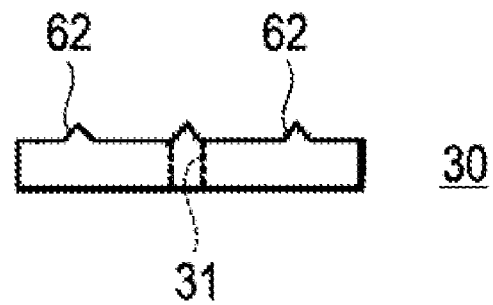
FIG. 13A is a schematic sectional structural drawing of a light guide plate of a backlight device according to a comparative example.
Figure 13B:
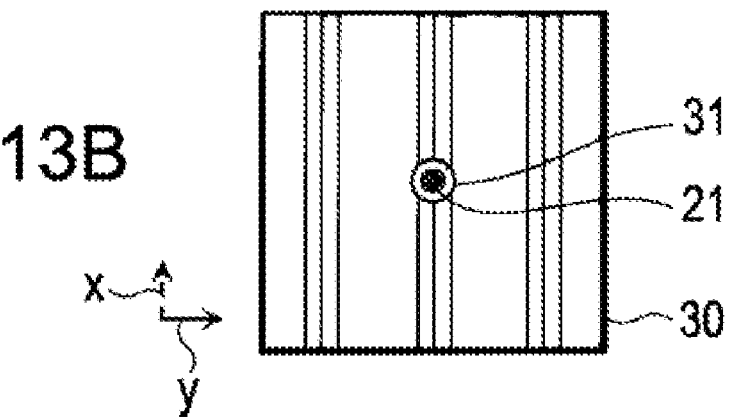
FIG. 13B is a schematic plan structural drawing of the light guide plate of the backlight device according to the comparative example.
Figure 13C:
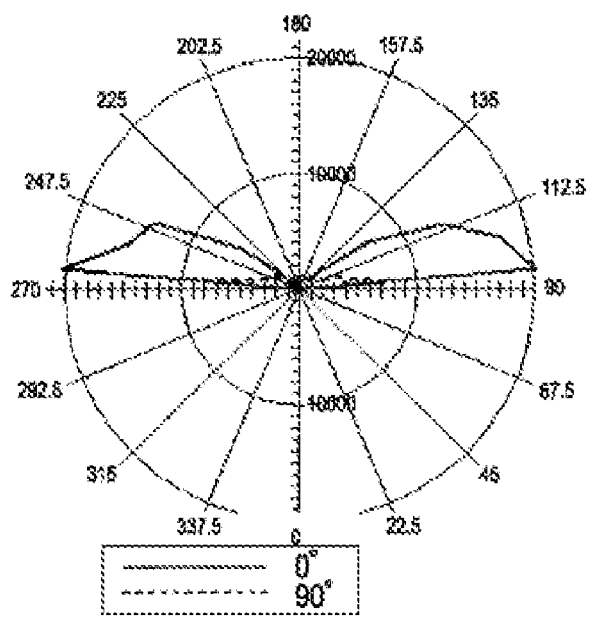
FIG. 13C is a drawing showing an angular brightness distribution of the backlight device according to the comparative example.

As shown in FIG. 13A, on the structure in that a triangular projection 62 is provided on the light-outgoing plane of the light guide plate 30, the angular brightness distribution has also been analyzed in the same way. In this case, as shown in FIG. 13B, the triangular projections 62 are arranged in the horizontal direction to the light-source opening 31 at equal intervals. The other configurations are the same as those of the above examples shown in FIGS. 7 to 12. In this case also, it is understood that the angular brightness distribution of the light outputted from the light guide plate 30, as shown in FIG. 13C, does not maintain the angular brightness distribution of the light source 21 as well as the angular brightness distribution in the horizontal direction is different from that in the perpendicular direction.

From these results, it is understood that the light guide plate 30 according to the present invention shown in FIGS. 7 to 11 can irradiate light therefrom with the acute angular brightness distribution maintaining the angular distribution of the light emitted from the light source in comparison with the conventional light guide plate shown in FIGS. 12 and 13.

Namely, when a backlight device is configured by the light guide plate according to the present invention, light can be irradiated from the light guide plate in a state that the angular distribution of the light emitted from the light source 21 is maintained more securely than in the conventional light guide plate.

Then, in the backlight device according to the present invention, an example will be described in that the shape of the hole or the projection provided in the light guide plate has the anisotropy in the emitting direction of the light source.

According to each embodiment described above, the shape of the hole or the projection provided in the light guide plate is cylindrical; however, the present invention is not limited to this shape, so that any shape may be adopted as long as it has a side face roughly perpendicular to the light-outgoing plane and the back plane of the light guide plate. In particular, it may be a prism, such as a quadrangular prism, so as to have not isotropy to the light from the light source like a cylinder but anisotropy in the emitting direction of the light source.

Figure 14:
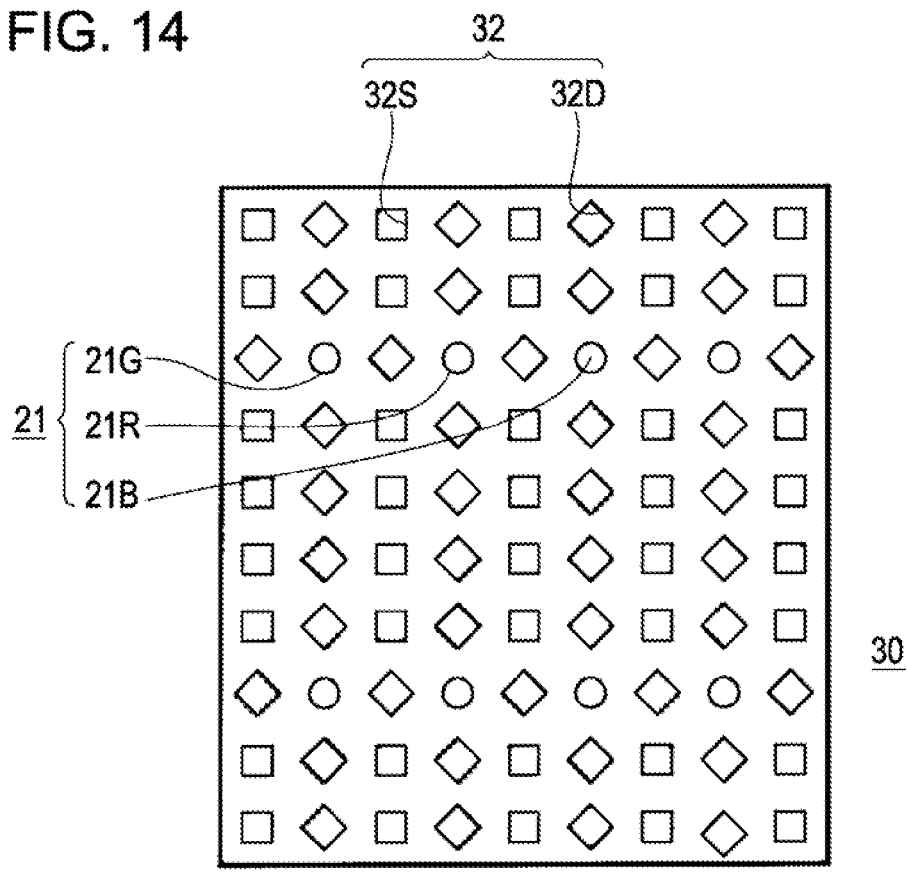
FIG. 14 is a schematic plan structural drawing of a backlight device according to an embodiment of the present invention.

FIG. 14 shows a schematic plan structural drawing of the light guide plate 30 in this case. In this example, the light sources 21 of RGB-color LEDs (21R, 21G, and 21B) lie in an array and between the light sources, prism holes 32 with a square cross-section are arranged at equal intervals. The prism hole 32 includes a square hole 32S with each side directed along the array directions and a diamond hole 32D with each side making an angle of about 45° with the array directions, and the square hole 32S and the diamond hole 32D are arrayed alternately.

As described above, when the hole or the projection has a cylindrical cross-section, the hole or the projection behaves to the light incident in any direction in the same way. Therefore, when the hole or the projection has an isotropic shape like a cylinder, the in-plane brightness distribution may be difficult to be uniformised depending on conditions such as the positional relationship and the distance to the light source, and the size.

Figure 15:
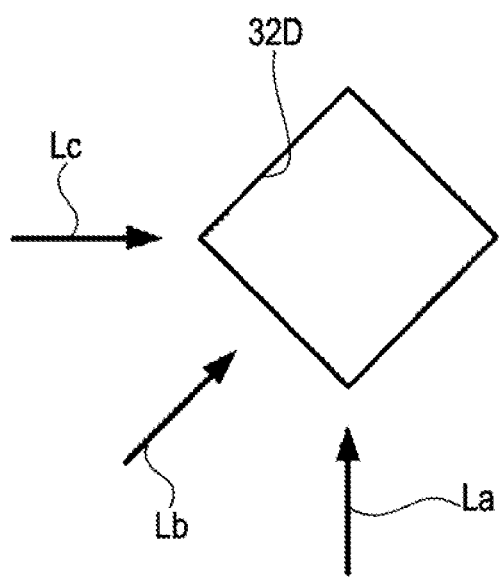
FIG. 15 is an exemplary view illustrating light proceeding directions in the backlight device according to the embodiment of the present invention.

Whereas, when the hole or the projection has a shape having anisotropy in the emitting direction of the light source like a square as described above, light enters the hole or the projection from different directions like light proceeding directions schematically shown by arrows La, Lb, and Lc in FIG. 15, so that the incident angle is different to what the light source is directed to which side face of the hole or the projection. When the diamond hole 32D is provided, it can be controlled whether light is emitted from the diamond hole 32D or the light is again returned to the inside of the light guide plate 30 by being totally reflected on the side faces of the diamond hole 32D.

Namely, when the shape of the hole or the projection anisotropy in the emitting direction (proceeding direction) of light, by appropriately selecting the shape of the hole or the projection in accordance with the relative position of the light source 21 and the hole or the projection, the allocation of the light from the light source 21 can be controlled such that part of the light from the light source 21 is emitted and the residual light is led to repeat reflection. When the light incident in the direction arrow La or arrow Lc shown in FIG. 15 is to positively be reflected, it is preferable that the shape of the hole or the projection be square.

However, when controlling the rate of light emission and reflection from the hole or the projection, the shape is not limited to the square, and any complicated geometrical shape, such as a polygon and an ellipse, may be adopted. Then, by selecting the shape and the arrangement optimum for the angular distribution of the light source including the hole or the projection with such a shape, the above-mentioned brightness non-uniformity can be avoided, leading to reduction avoiding or improving of the in-plane brightness distribution and the in-plane chromaticity distribution.

Figure 16:
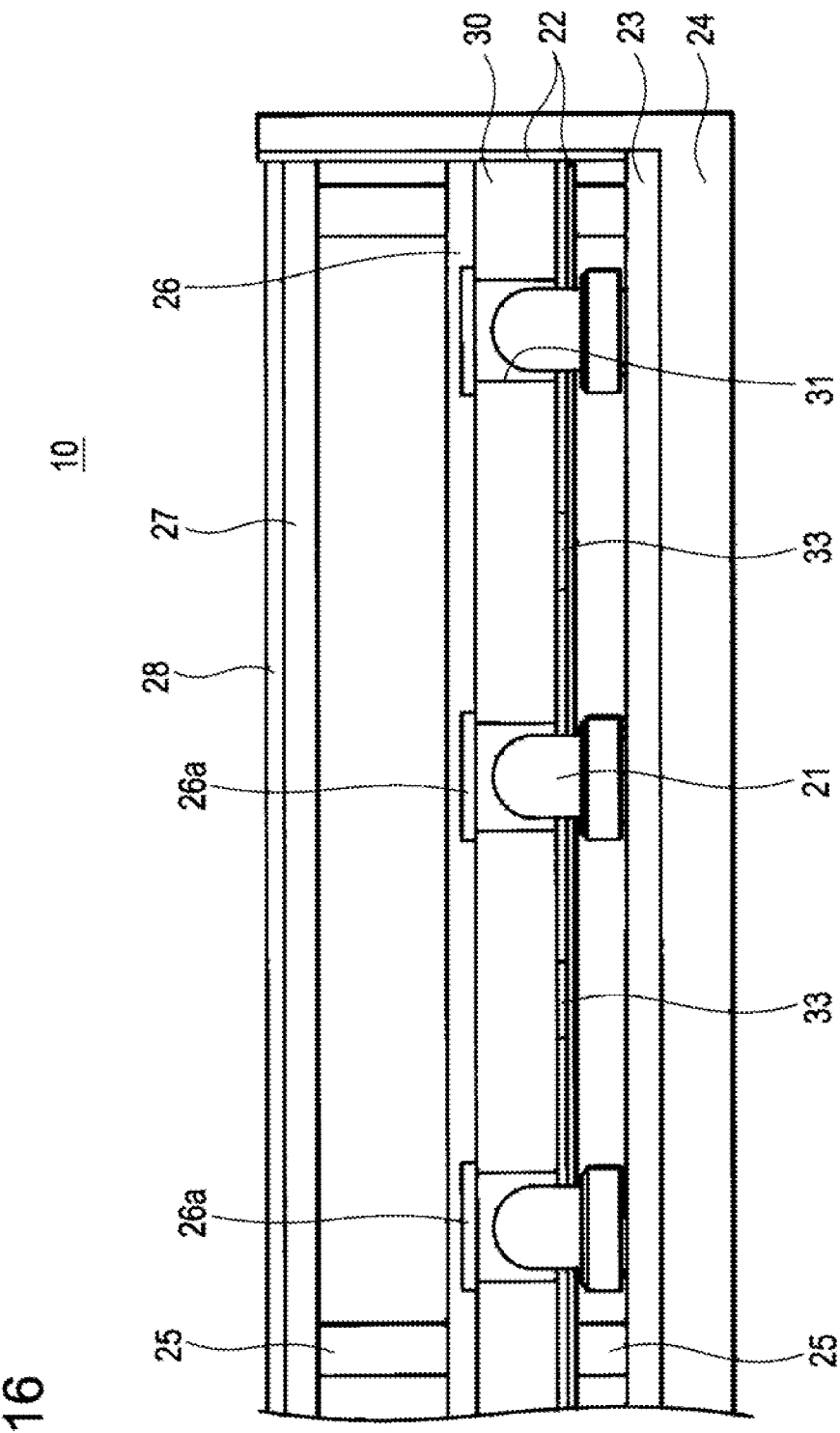
FIG. 16 is a schematic sectional structural drawing of the essential part of a backlight device according to an embodiment of the present invention.
Figure 17:
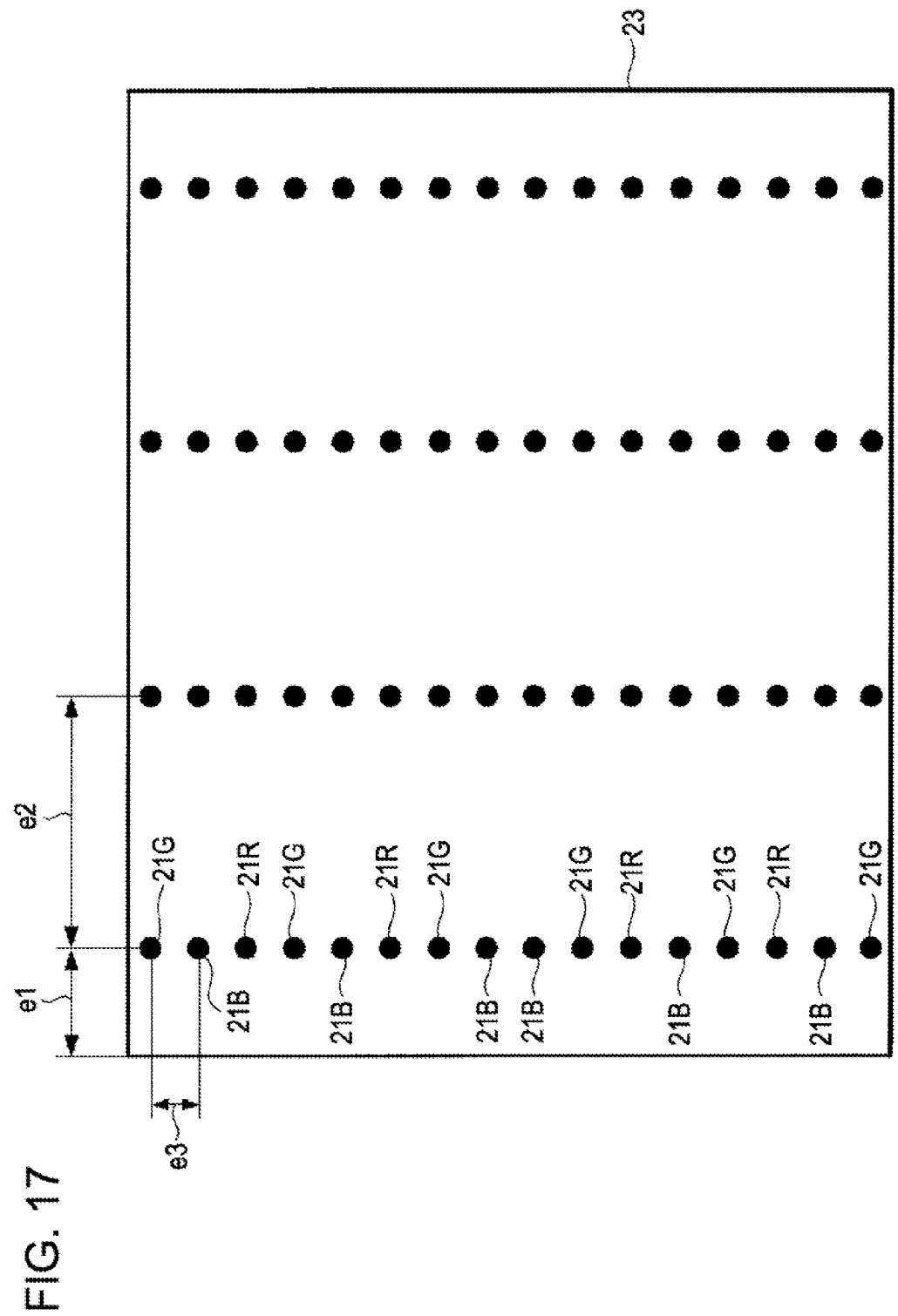
FIG. 17 is a schematic plan structural drawing showing the arrangement of light sources of the backlight device according to the embodiment of the present invention.
Figure 18:
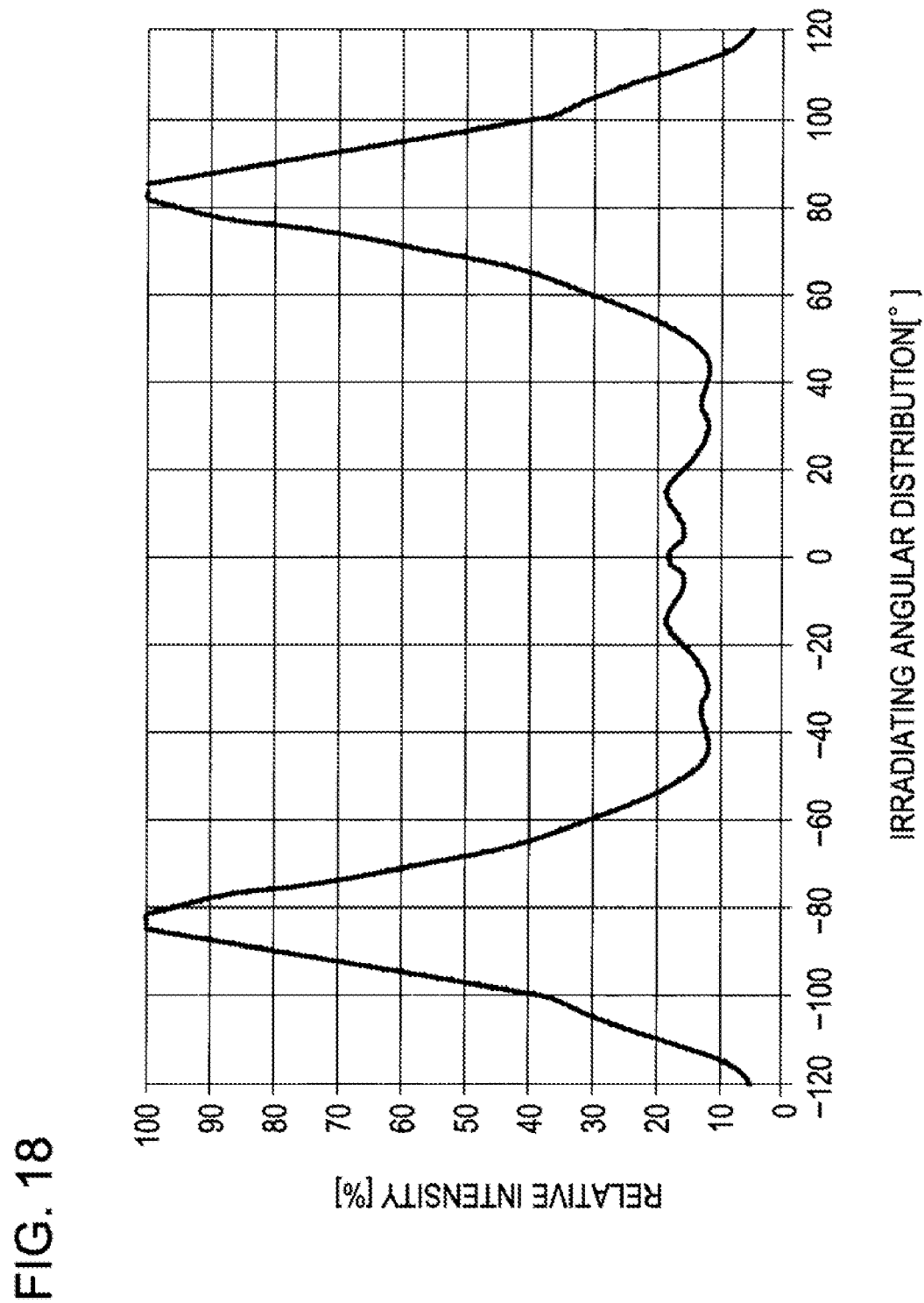
FIG. 18 is a drawing showing the angular distribution of the light source of the backlight device according to the embodiment of the present invention.
Figure 19:
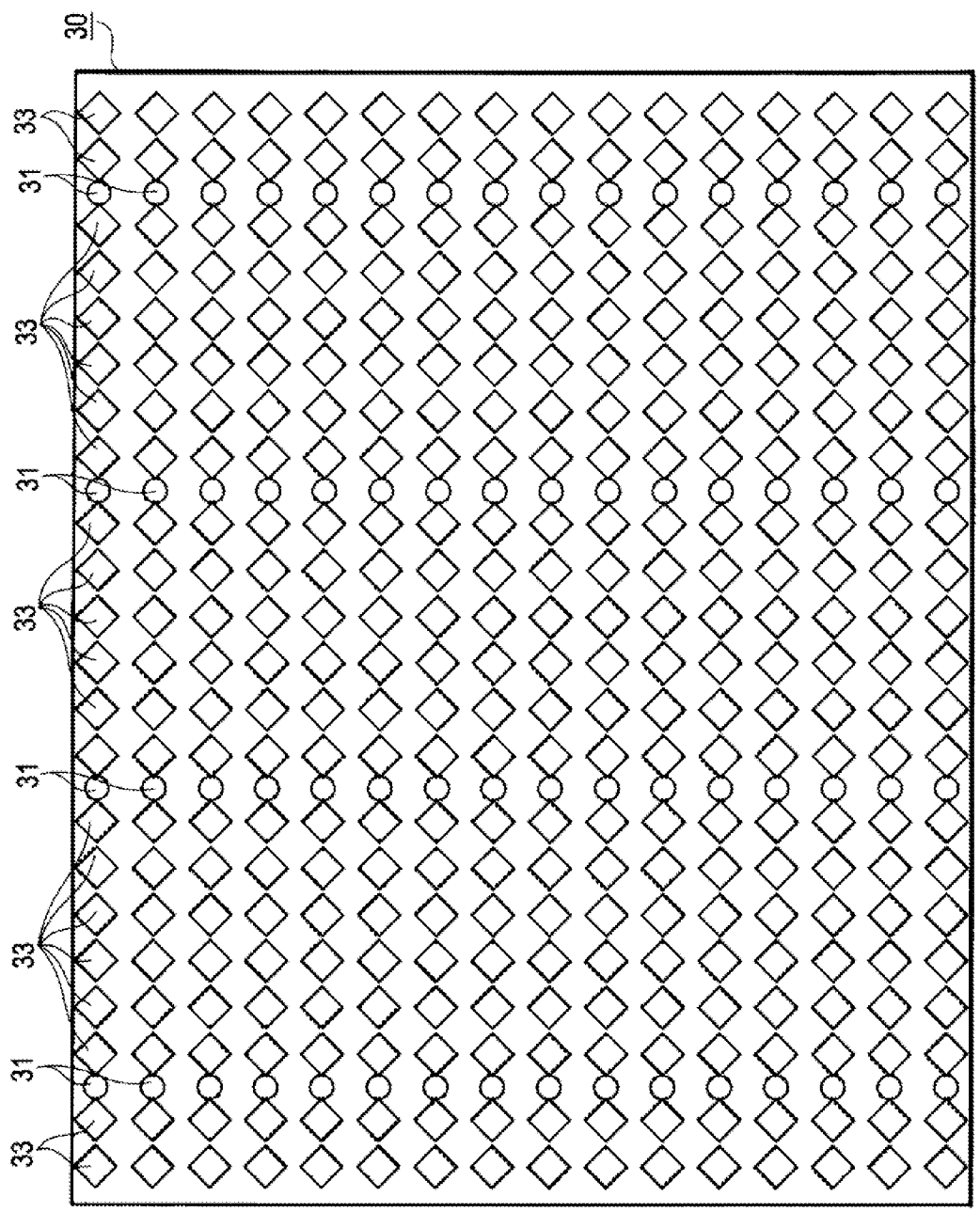
FIG. 19 is a schematic plan structural drawing of the backlight device according to the embodiment of the present invention.

As an example, the angular brightness distribution when square projections are provided on the back plane of the light guide plate has been discussed. In this example, the structure corresponds to an LED backlight device for a 17-inch liquid crystal monitor. FIG. 16 shows a schematic sectional structural drawing of its essential part. LEDs are used for the light source 21; the ratio of the number of the RGB LEDs is blue (B):green (G):red (R)=3:3:2; and the total number is 64. These light sources 21, as shown in FIG. 16, are arranged within the cylindrical light-source openings 31 provided in the light guide plate 30. On the back plane of the light guide plate 30, quadrangular prism projections 33 having a height of 0.3 mm with a square planar shape and an apex angle arranged close to the light source 21 are formed. On side faces and the back plane of the light guide plate 30, reflection structures 22 composed of a specular reflection sheet are provided. On the light-outgoing plane of the light guide plate 30, a diverter sheet 26 is arranged at a position directly above the light sources 21 for diffusing the light emitted in a direct front direction from the LED, i.e., a direction perpendicular to the light-outgoing plane. This is a film having a white diffusing material printed only on positions directly above the LEDs. When the light irradiated directly above the LED is sufficiently suppressed by controlling the LED angular distribution, a liquid crystal display apparatus can be configured without the diverter sheet. On the diverter sheet 26, a diffusing plate 27 and a diffusing sheet 28 are laminated in that order via a spacer 25. The diffusing sheet 28 includes a sheet with a high so-called start-up effect for adjusting the light-emitting direction in the front. The light sources 21 are arranged on a wiring board 23 via spacers 25, and the entire structure is accommodated within a casing 24. The thickness between a reflection plate, which is the reflection structure 22 on the back plane of the light guide plate 30 in this case, and a liquid crystal display panel (not shown) is 24 mm. A schematic plan structural drawing of the arrangement of a red light source 21R, a green light source 21G, and a blue light source 21B is shown in FIG. 17. In this case, 16 LEDs are arranged in the perpendicular direction and 4 LED lines in the horizontal direction; the distance e1 between the end and the first line LED is 35 mm; the distance e2 between the light source lines is 90 mm; and the distance e3 between the each-line light sources is 17.2 mm. The LED includes a side emitting type LED which is laterally strongly irradiating light. Its angular distribution is shown in FIG. 18. FIG. 19 is a schematic plan structural drawing of the back plane of the light guide plate 30. The projections 33 have substantially the same shape, and thoroughly arranged between the arrayed light-source openings 31 at roughly the same density.

Figure 20B:
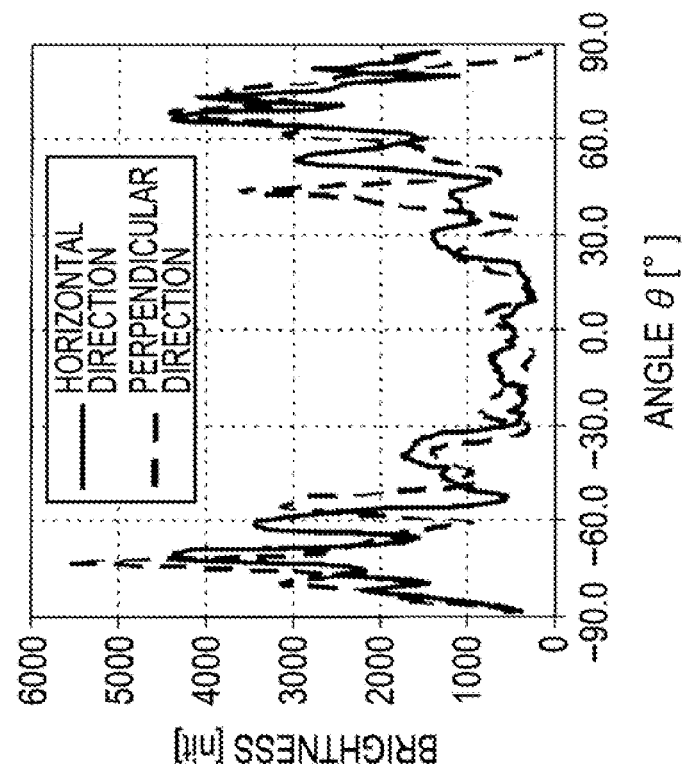
FIGS. 20A and 20B are drawings showing the angular brightness distribution on the light guide plate of the backlight device according to the embodiment of the present invention.
Figure 20A:
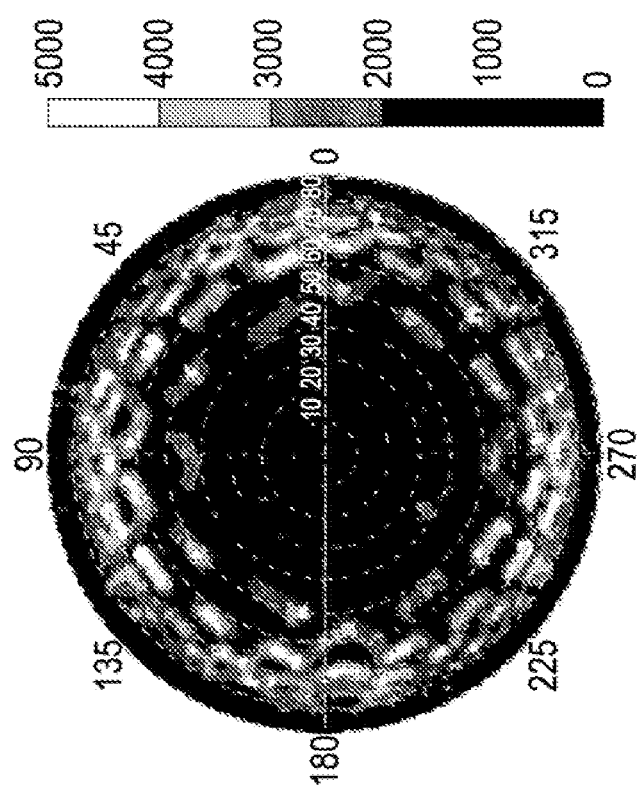
Figure 21B:
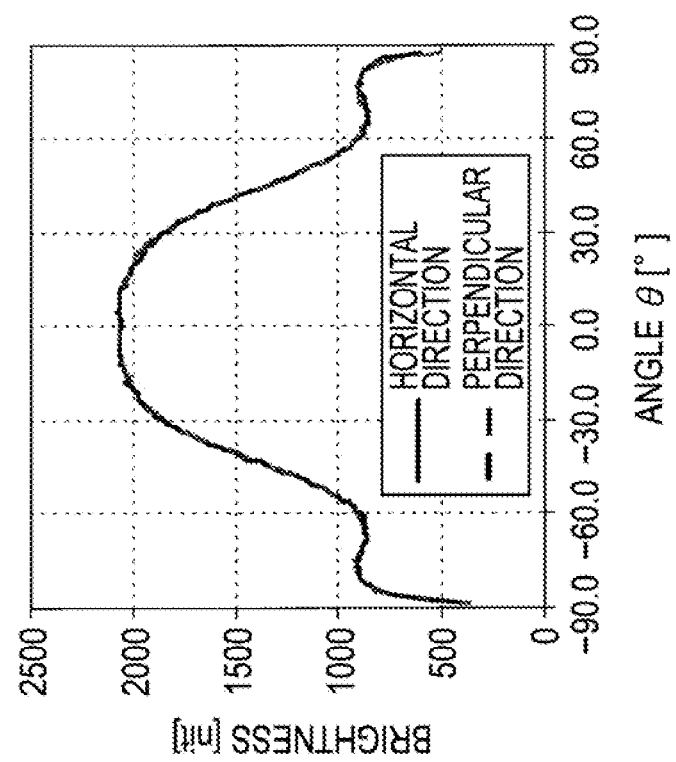
FIGS. 21A and 21B are drawings showing the angular brightness distribution on a diffusing sheet of the backlight device according to the embodiment of the present invention.
Figure 21A:
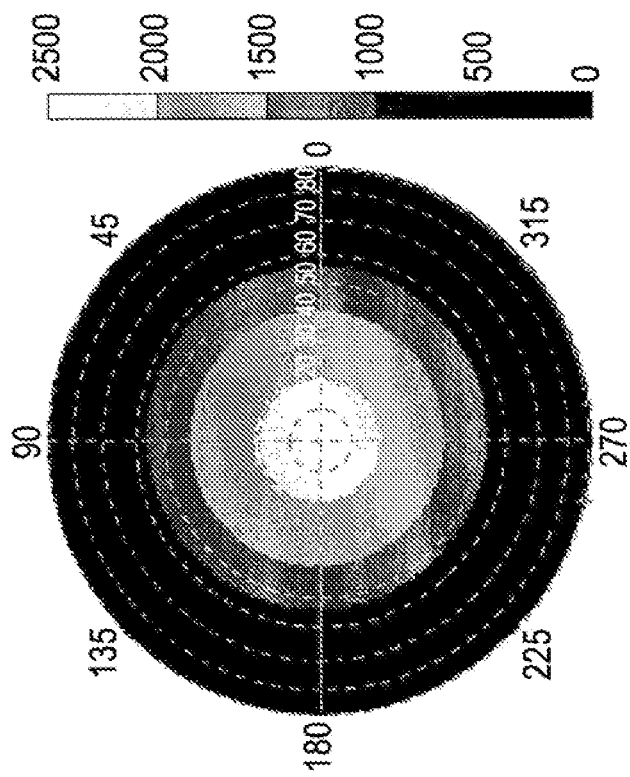

The angular brightness distributions on the light guide plate 30 and the diffusing sheet 28 according to this configuration are shown in FIGS. 20A and 20B and FIGS. 21A and 21B, respectively. FIGS. 20A and 21A show the planar distribution and FIGS. 20B and 21B show distributions on sections in horizontal and perpendicular directions, respectively. From FIGS. 20A and 20B, it is understood that the light guide plate 30 maintains the LED angular distribution so as to have a strong distribution in an inclined direction. On the other hand, it is understood from FIGS. 21A and 21B that the angular distribution of the light having the emitting direction aligned by the diffusing sheet 28 after being outputted from the light guide plate is aligned in the front direction.

In the brightness non-uniformity of the backlight device, when the maximum brightness is Lmax and the minimum brightness is Lmin, (Lmax−Lmin)/Lmax=about 10%.

When a backlight device having an LED arranged directly below the diffusing plate is configured without using the light guide plate, the backlight device requires a thickness of about 60 mm for suppressing the brightness non-uniformity to the same extent. Thus, it is understood that the brightness non-uniformity can be suppressed by using the light guide plate according to the present invention, thereby reducing the thickness of the backlight device.

Figure 22:
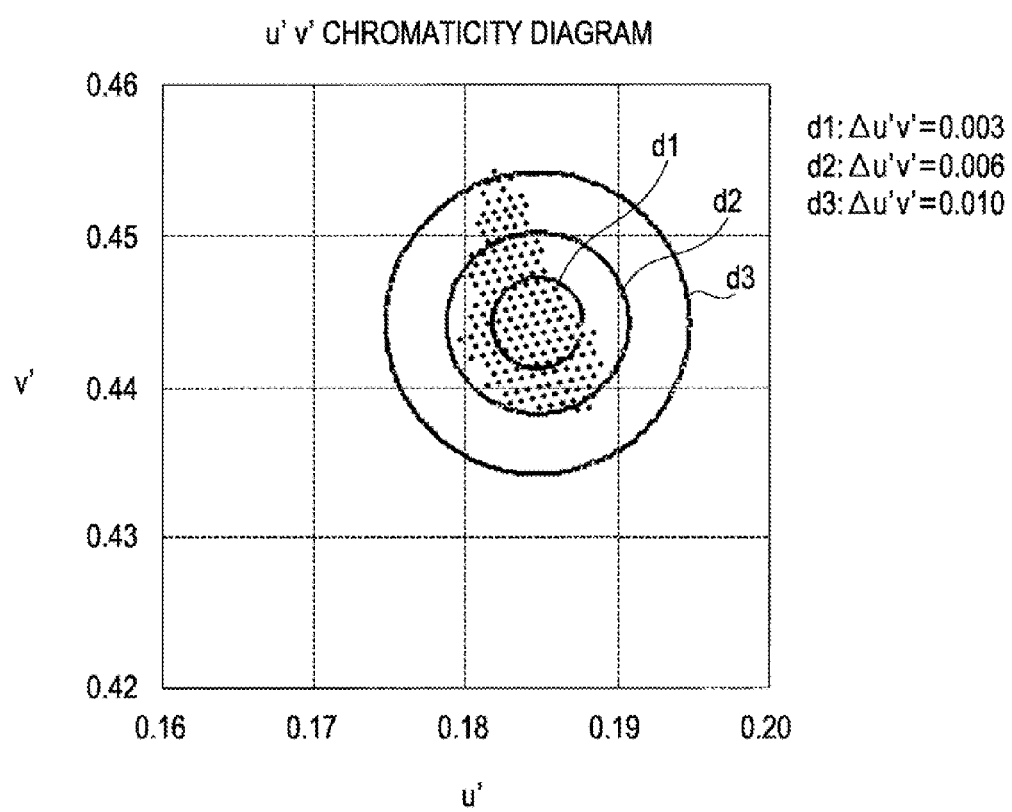
FIG. 22 is a chromaticity drawing showing in plane chromaticity points of the backlight device according to the embodiment of the present invention.

FIG. 22 shows the color non-uniformity measured on the diffusing sheet 28. From the results of FIG. 22, it is understood that the color non-uniformity of the backlight device according to the present invention can be suppressed in a range of about $\Delta u'v' \leq 0.010$.

According to the embodiment, although the feedback and electrical control with a color sensor are not performed and the entire LEDs are driven by a constant current in series, the color non-uniformity can be suppressed to the same extent as that of a conventional backlight device including an LED light source. Thus, by adding the above-mentioned feedback and electrical control like those in the conventional backlight device, the color non-uniformity can be further suppressed.

According to the embodiment, an example in that projections are provided on the light guide plate is shown. When providing the projections, as the essential part of the light guide plate according to the embodiment is shown in the schematic sectional view of FIG. 23, when the section length, i.e., the length along which the light from the nearest light source passes over, is L; the height of the section is H; and the angle at which the light amount emitted from the light source is reduced to 25% of that at the main peak angle is α, it is preferable that:

$$L/H \geq \tan \alpha \qquad (1).$$

Figure 23:
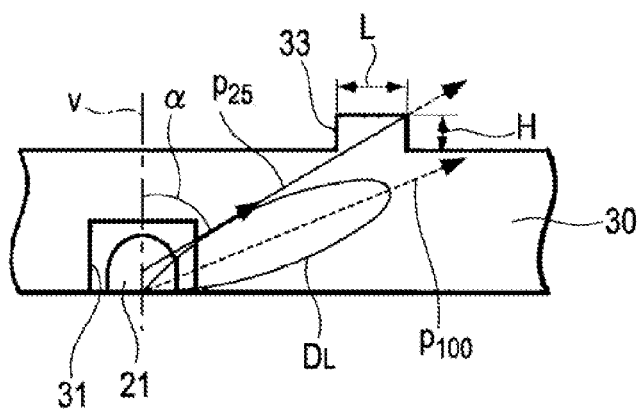
FIG. 23 is an exemplary view of projections provided the backlight device according to the present invention.

In FIG. 23, the intensity distribution of the light emitted from the light source 21 and led to within the light guide plate 30 from the light-source opening 31 is designated as DL and the direction of the strongest intensity, i.e., the main peak, is designated as broken line p100. The angle at which the emitted light amount is reduced to 25% of that at the main peak is designated as arrow p25. The angle to the normal line to arrow p25 is designated as α. At this time, when the relationship between the lateral length L of the projection 33 and the height H thereof satisfies the above equation (1), the 25% or more emitted light amount of the main peak is reflected by the side face of the projection 33. Hence, according to the present invention, when the projection is provided on the light guide plate, it is preferable that the width and height of the projection satisfy the above equation (1).

When the upper face of the projection is roughly in parallel with the light-outgoing plane, i.e., it is inclined to the light-outgoing plane at an angle of 0°±10°, preferably 0°∓5°, more preferably 0°±3°, the angular brightness distribution of the light outputted from the upper face can be substantially equalized to that of the light outputted from portions other than the projection.

In the above examples described with reference to FIGS. 16 and 19, the height of the projection 33 on the light guide plate 30 is 0.3 mm and the width in the diagonal direction thereof is 13 mm.

In this case, the side-emitting type LED used as the light source 21, as shown in FIG. 18, has a strong intensity distribution in the lateral direction. The angle α at which the light amount emitted from this light source is reduced to 25% of that at the main peak angle is about 55° as understood from FIG. 18. That is, in this case, the height H of the projection 33 provided on the light guide plate 30 is 0.3 mm and the section length L thereof is 13 mm, so that the ratio $L/H \approx 43$. Since $\tan(55°) \approx 1.4$, it is understood that this satisfies $L/H \geq \tan α$.

According to the embodiment described above, the shape of the projections provided on the light guide plate is substantially the same. When the shape of the holes or projections is the same in such a manner, the structure has the advantage of comparatively simplified configuration and easy manufacturing. If the arrangement of light sources is uniform, the in-plane brightness is easily uniformised, suppressing the brightness non-uniformity and the color non-uniformity.

On the other hand, shapes of a plurality of the holes or the projections arranged on the light guide plate may be selected in accordance with the position from the light source so that the light emitted from the light source is difficult to be outside derived in the vicinity of the light source while the light emitted from the light source is easily outside derived at a comparatively distant place from the light source. An embodiment of this case will be described with reference to the schematic sectional structural drawing of FIG. 24A and the schematic plan structural drawing of FIG. 24B.

Figure 24A:
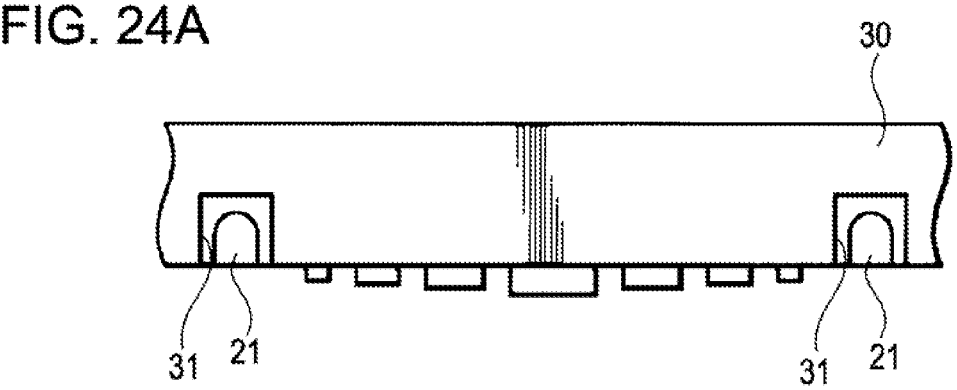
FIGS. 24A and 24B are schematic sectional and plan structural drawings of a backlight device according to an embodiment of the present invention, respectively.
Figure 24B:
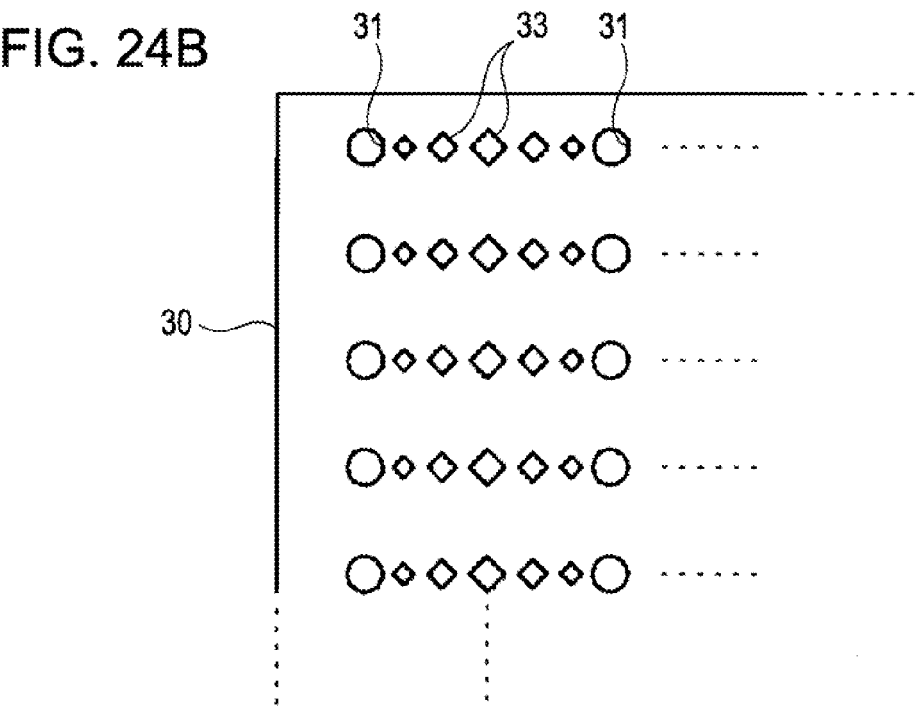

According to the embodiment, as shown in FIG. 24A, on the back plane of the light guide plate 30, cylindrical light-source openings 31 are provided so as to accommodate the LED light source 21 therein. On the back plane between the light-source openings 31, a plurality of the projections 33 are provided. With increasing width and height of the projection 33, light is easily outside derived. Thus, as shown in FIGS. 24A and 24B, the shapes of the projections 33 are selected such that the closer to the light source 21, the width and/or the height are reduced; and the further from the light source 21, the width and/or the height are increased. By such a configuration, light is difficult to be outside derived in the vicinity of the light source while light is easily outside derived at a comparatively spaced position from the light source, improving light availability. In particular, like the embodiment described with reference to FIGS. 16 to 19, when the light sources 21 are not arranged with a uniform distribution, by appropriately selecting the shape of the hole or the projection in accordance with the relative position to the light source 21, even to the position spaced from the light source 21, light is led through the inside of the light guide plate, so that the light can be outside derived, thereby improving the light availability.

Then, the angular brightness distribution will be discussed when the light guide plate 30 with the shape mentioned above is used, and a light deflecting sheet is provided, which outputs incident light having a specific angular distribution toward the light outgoing side of the light guide plate 30 with angular brightness distribution having a peak in a specific direction, perpendicular direction to the light-outgoing plane, for example.

Figure 25A:
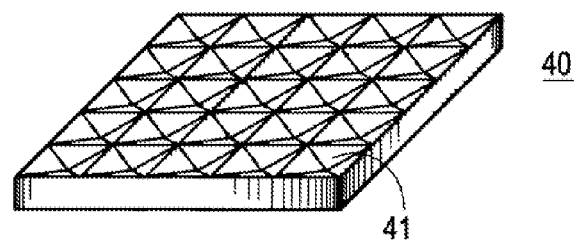
FIG. 25A is a schematic perspective structural drawing of a light deflecting sheet of a backlight device according to an embodiment of the present invention.

This light deflecting sheet may include a light deflecting sheet 40 in that quadrangular pyramidal concave structures 41 are continuously juxtaposed in plane, as shown in FIG. 25A.

Figure 25B:
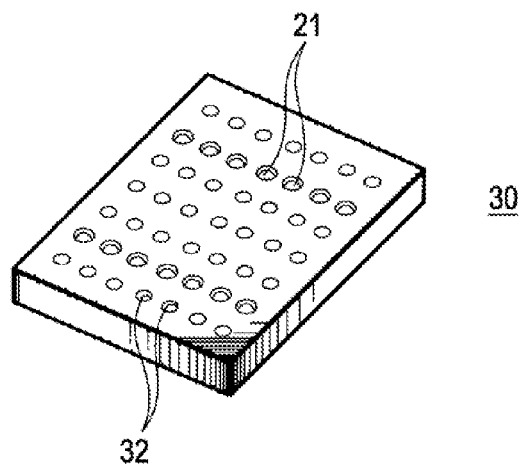
FIG. 25B is a schematic perspective structural drawing of a light guide plate of the backlight device according to the embodiment of the present invention.

As shown in FIG. 25B, cylindrical holes 32 penetrating the light guide plate 30 are arranged on the light guide plate 30 between arrays of the light-source openings 31, each having the light source 21 accommodated therein.

Figure 25C:
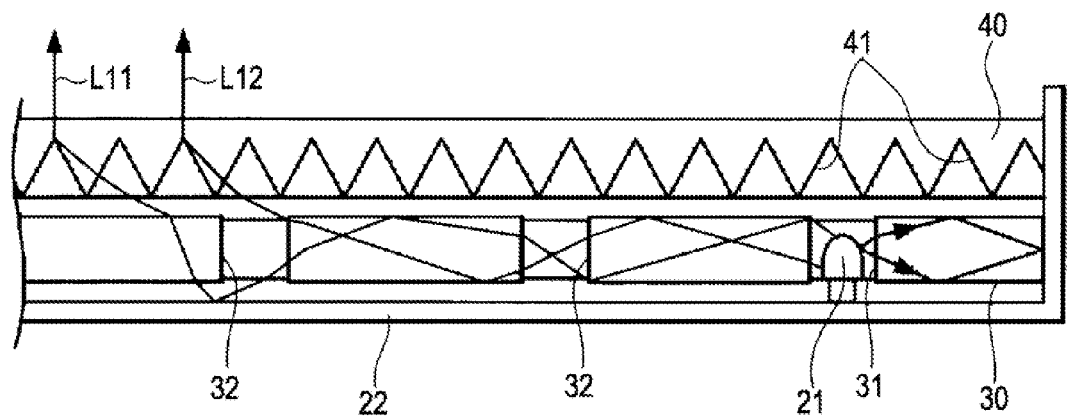
FIG. 25C is a schematic sectional structural drawing of the backlight device according to the embodiment of the present invention.

FIG. 25C is a schematic sectional view of the essential part of the backlight device according to an embodiment of the present invention. In FIG. 25C, like reference characters designate like portions corresponding to those in FIGS. 25A and 25B and the description thereof will be omitted for avoiding duplication. According to the embodiment, the concave structures 41 of the light deflecting sheet 40 are arranged to oppose the light-outgoing plane of the light guide plate 30, and on the back plane and side faces of the light guide plate 30, the reflection structure 22 composed of a specular reflection sheet is provided.

By such a configuration, the light emitted from the light source 21 and shown by arrows L11 and L12 is totally reflected within the light guide plate 30. In the hole 32, the light is led while its angular distribution being substantially maintained, and then it is outputted from the hole 32 after repeating the reflection so as to enter the light deflecting sheet 40. The light outputted toward the back plane is once reflected by the reflection structure 22 and then, it enters the light deflecting sheet 40. When the light source herein is to be the above-mentioned side-emitting type LED, the light incident in the light deflecting sheet 40 has also the same angular distribution.

The light deflecting sheet 40 configured as FIG. 25A can output light having a peak in a specific direction with angular brightness distribution having a peak in a specific direction, perpendicular direction, for example, to the light outgoing plane of the light deflecting sheet 40. The angular brightness distribution of the light outputted from the light deflecting sheet 40 and the light amount returned to the light guide plate 30 due to the light deflecting sheet 40 can be controlled by changing the shape, the slope angle, in particular, of the concave structure provided on the light deflecting sheet 40 and the refractive index of components. Thus, the appropriate shape of the concave structure suitable for the angular distribution of incident light to the light deflecting sheet 40 enables the display apparatus using the light deflecting sheet 40 to have desirable angular brightness distribution. By reducing the returned light, the loss at the reflection structure can be reduced, improving the overall brightness. The shapes of the concave structure of the light deflecting sheet 40 will be described later in detail.

Figure 26A:
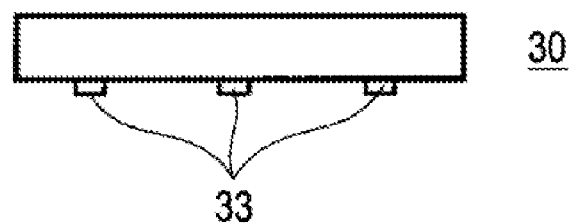
FIG. 26A is a schematic sectional structural drawing of a light guide plate of a backlight device according to an embodiment of the present invention.

The angular brightness distribution of the light outputted from the light deflecting sheet has been studied when the light deflecting sheet is provided in such a manner. In this example, as shown in the schematic section of the light guide plate 30 in FIG. 26A, the projection 33 is provided on the back plane of the light guide plate in the same way as in the example shown in FIG. 11. The projections 33 are arranged in an array between the arrayed light sources 21 in the same way as in the example shown in FIG. 25B. The light guide plate 30 made from PMMA has a thickness of 10 mm and the 0.5 mm high projections. The spaces to the light deflecting sheet 40 and the reflection structure 22 are 5 mm, respectively. The light deflecting sheet 40 made from PMMA has the apex angle 72° of its concave structure.

Figure 26B:
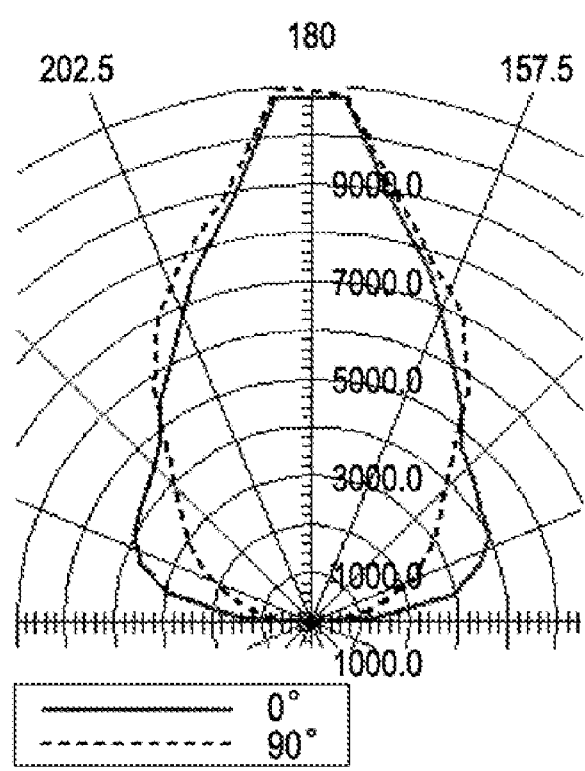
FIG. 26B is a drawing showing an angular brightness distribution of the backlight device according to the embodiment of the present invention.

The angular brightness distribution on the light deflecting sheet 40 configured in such a manner is shown in FIG. 26B. From this result, it is understood that the angular brightness distribution of the light outputted from the light deflecting sheet 40 on the light guide plate according to the present invention has brightness peaks in the front to the light emitting surface in both the horizontal and perpendicular directions.

Figure 27:
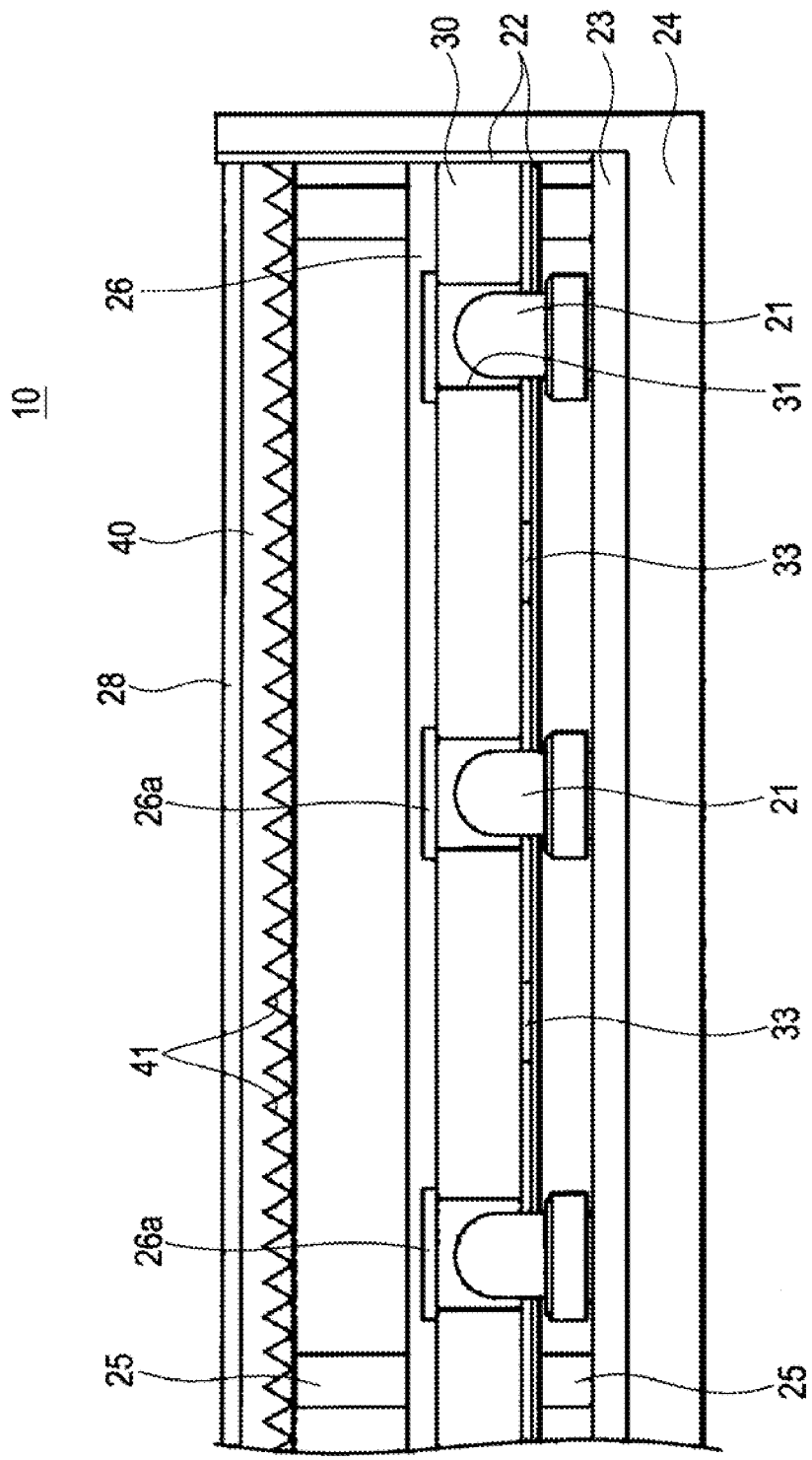
FIG. 27 is a schematic sectional structural drawing of the essential part of a backlight device according to an embodiment of the present invention.

The angular brightness distribution of the light outputted from the light deflecting sheet has been studied when the light guide plate configured as described with reference to FIGS. 16, 17, and 19 and the light deflecting sheet 40 arranged on the light outgoing side of the light guide plate 30 in the same way as in the example shown in FIG. 25A are provided as shown in the schematic section of FIG. 27. In FIG. 27, like reference characters designate like portions corresponding to those in FIG. 16 and the description thereof will be omitted for avoiding duplication.

Figure 28B:
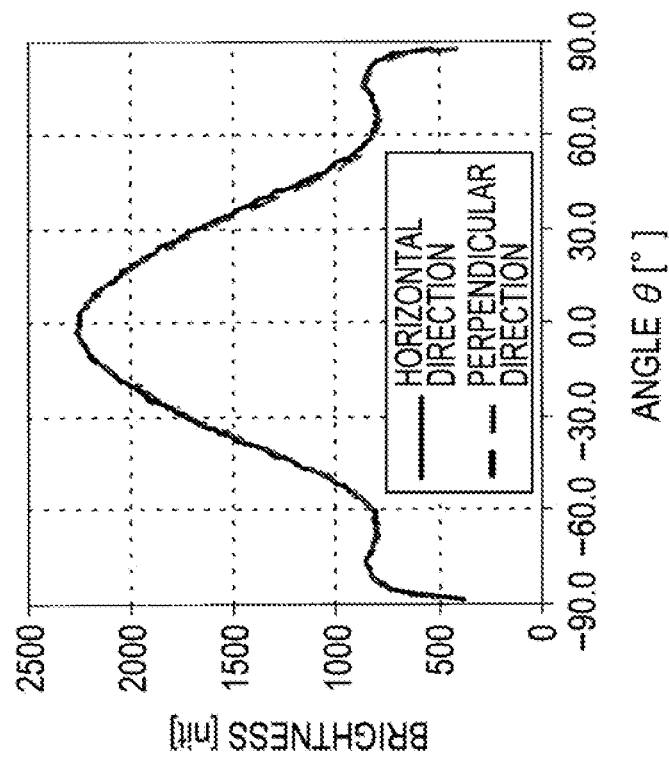
FIGS. 28A and 28B are drawings showing the angular brightness distribution on a diffusing sheet of the backlight device according to the embodiment of the present invention.
Figure 28A:
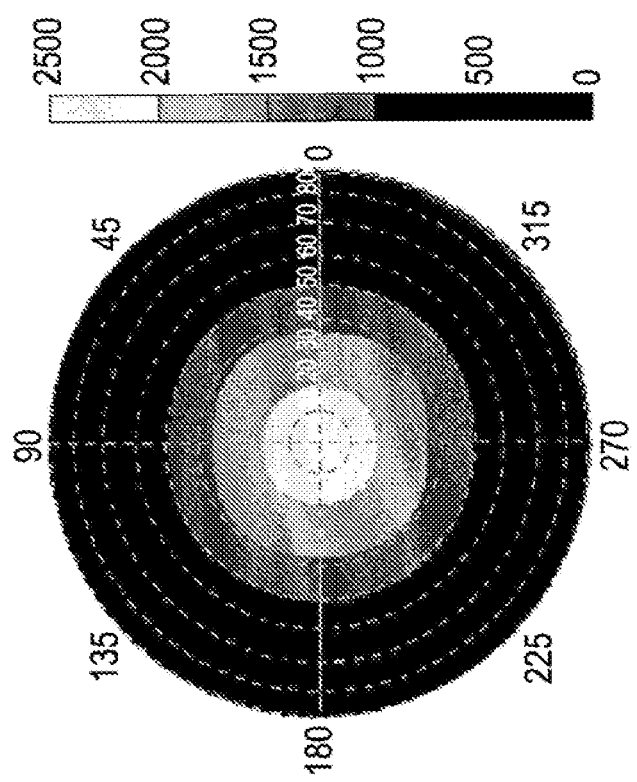

The result is shown in FIGS. 28A and 28B. As apparent from the comparison of FIG. 28A with FIG. 28B, it is understood that by providing the light deflecting sheet 40, the distribution becomes sharper in the perpendicular direction and the brightness peak value is increased.

From these results, it is understood that the backlight device according to the present invention can emit light with the angular brightness distribution having a high brightness peak in a desired direction, in the front, for example. When the specular reflection sheet is used as the reflection structure provided on the light guide plate, satisfactory results can also be obtained.

In such a manner, in the backlight device according to the present invention, the light guide plate can mix the light of the three-color LED light source and can control the angular brightness distribution. Also, it can reduce the loss due to the returned light so as to improve the brightness. Since light absorption by the reflection structure due to the returned light can be suppressed, heat generation is also suppressed.

Furthermore, since the in-plane brightness distribution can be uniformised by the light guide plate, the thickness of the liquid crystal display apparatus including the backlight device with the light guide plate can be reduced.

When the hole or the projection is provided on the light guide plate, for improving the brightness distribution uniformity in plane of the light guide plate, it is effective to have the following structures:

(1) A number of the holes, each being reduced in diameter, are arranged.
(2) In the region where the brightness becomes comparatively high, such as the vicinity of the light source, the hole is reduced in diameter or the number is reduced.
(3) The thickness of the light guide plate is increased or the refractive index thereof is reduced.
(4) The space between the light guide plate and the reflection structure and the space between the light guide plate and the light deflecting sheet are increased.

However, because of the trade-off relationship between the thickness of the backlight device and the above-items (3) and (4), it is necessary to balance them.

Even when the above-mentioned side-emitting type LED is used, since the light is not entirely emitted in the perpendicular direction to the light outgoing plane, it is necessary to take measures to meet the small amount of the light incident perpendicularly. It is desirable to arrange a reflection diffusing sheet directly above the LED light source or the light-source opening as the measures.

For suppressing changes in angular distribution of light incident in the light guide plate from the light source, preferably, the light source is not provided on the bottom of the back plane of the light guide plate, but at least one opening is formed as a light-source opening on the light guide plate so as to accommodate the light source therein.

The shape of the light-source opening is desirable to be a columnar opening with side faces roughly perpendicular to the light outgoing plane of the light guide plate and with the upper surface substantially parallel thereto. When the side face and the upper surface are directed to the light-outgoing plane of the light guide plate at angles of about 90°±10° and 0°±10°, respectively, the angular distribution can be sufficiently maintained. Desirably, at angles of 90°±5° and 0°±5°, more desirably, at angles of 90°±3° and 0°±3°, the angular distribution can be more securely maintained.

When using a light source and a light deflecting sheet having a sharp angular brightness distribution like in the backlight device according to the present invention described above, the angular brightness distribution of the emitted light may be excessively narrow. This means that the angle of field of the display apparatus including the backlight device becomes narrow.

In order to solve this problem, the following configurations may be adopted:
(1) On the light outgoing plane of the light deflecting sheet, a diffusing sheet is arranged; however, for reducing the returned light, a sheet with high transmittance is desirable.
(2) A reflection structure having a diffusing effect is used.
(3) The hole or the projection is tapered at least partly.

Then, a light deflecting sheet incorporating the backlight device according to the present invention will be described in detail.

Figure 29:
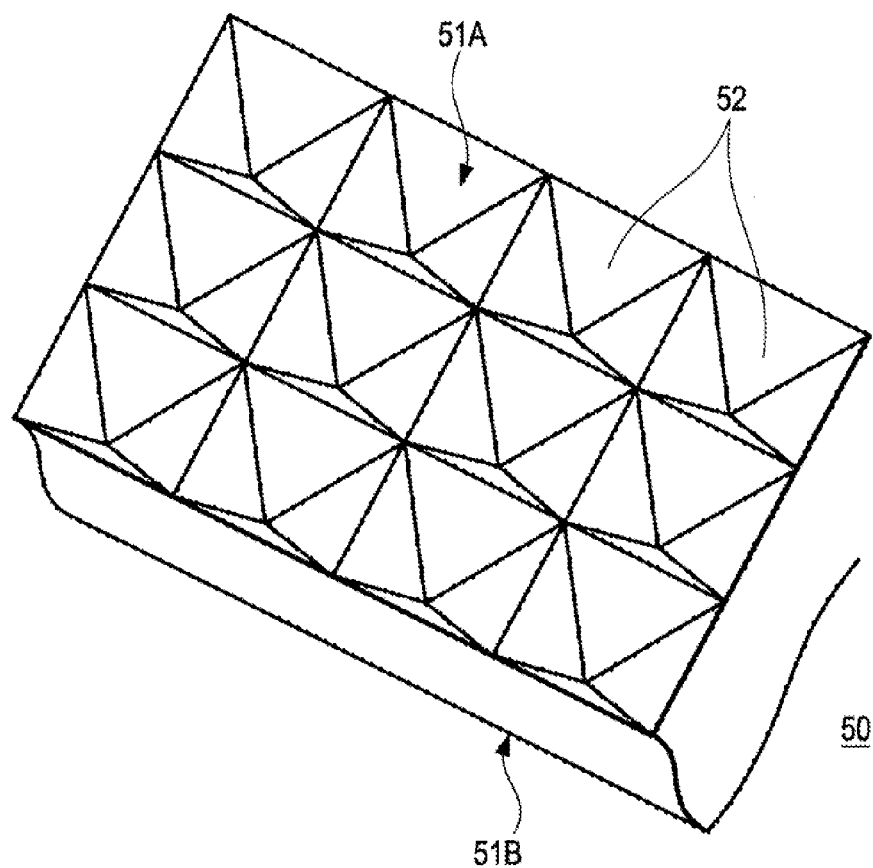
FIG. 29 is a schematic perspective structural drawing of the light deflecting sheet according to the embodiment of the present invention.

FIG. 29 is a schematic perspective view of a light deflecting sheet according to the present invention. A light deflecting sheet 50 according to the present invention is provided with a plurality of concave structures 52 juxtaposed on its light incident plane 51A, the concave structure 52 being a quadrangular pyramidal in the drawing. Namely, on the entire plane 51A, the quadrangular pyramidal concave structures 52 are two-dimensionally arranged continuously.

Figure 30A:
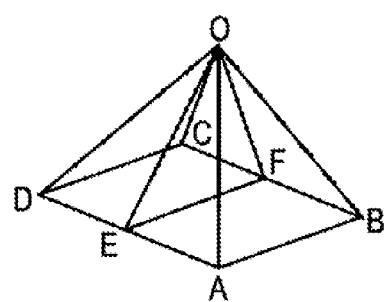
FIGS. 30A to 30C are geometric drawings for illustrating the shape of the concave structure of the light deflecting sheet according to the embodiment of the present invention.
Figure 30B:
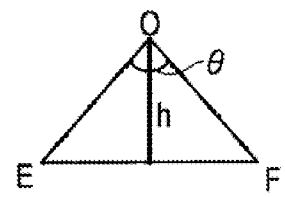
Figure 30C:
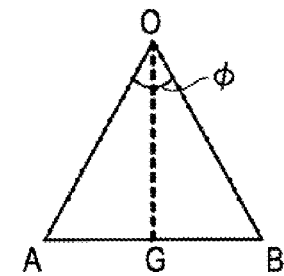

The shape of the concave structure 52 will be described with reference to geometrical drawings of FIGS. 30A to 30C. FIG. 30A shows a quadrangular pyramid having an apex O and a basal plane ABCD. The apex angle of the triangle OEF formed by connecting the apex O to the midpoints E and F of the respective sides AD and BD is defined as the apex angle θ of the concave structure 52, as shown in FIG. 30B. The apex angle θ is larger than the apex angle φ of the triangle ABC.

When providing such a quadrangular pyramidal concave structure 52, light behaviors due to the difference in incident angle of the incident light are shown in FIG. 31. In FIG. 31, when the apex angle θ is about 70°, there are shown refracting situations of light beams incident in the light deflecting sheet 50 at angles to the plane 51A of 0°, 20°, 40°, 60°, and 80°. Arrows L1 and L2 show cases where incident angles are 0° and 20°, respectively, and beams are refracted on the interface on the upper-face side of the concave structure 52 and outputted from the back plane 51B. Arrows L3 and L4 show cases where the incident angle is 40°, and beams are totally reflected by the back plane 51B as shown in arrow L3 or as shown in arrow L4, the beams are totally reflected by the slope of the adjacent concave structure 52 and outputted from the back plane 51B. Arrows L5 and L6 show cases where the incident angle is 60°, and beams are totally reflected by the back plane 51B in the same way as shown in arrow L5, alternatively, as shown in arrow L6, the beams are totally reflected by the slope of the adjacent concave structure 52 and outputted from the back plane 51B. Arrow L7 shows a case where the incident angle is 80°, and a beam does not reach the vicinity of the apex of the concave structure 52 inside the circle surrounded by a broken line k but is totally reflected by the slope of the adjacent concave structure 52 and outputted from the back plane 51B.

That is, it is understood that the beam with an incident angle of 20° or less to the apex angle of the concave structure is outputted slightly obliquely from the perpendicular direction to the back plane 51B; the beam incident at an angle of about 80° is outputted from the back plane 51B in a roughly perpendicular direction thereto. It is also understood that beams with incident angles 40° to 60° are different in emitting angle and reflection ratio depending on the incident point of the concave structure 52.

When using the light deflecting sheet for an illumination apparatus, such as a backlight device, or a display apparatus, such as a liquid crystal display, it is generally preferable that the emitting angle of light outputted from the back plane 51, which is a light outgoing plane, of the light deflecting sheet 50 be perpendicular to the back plane 51.

Figure 32:
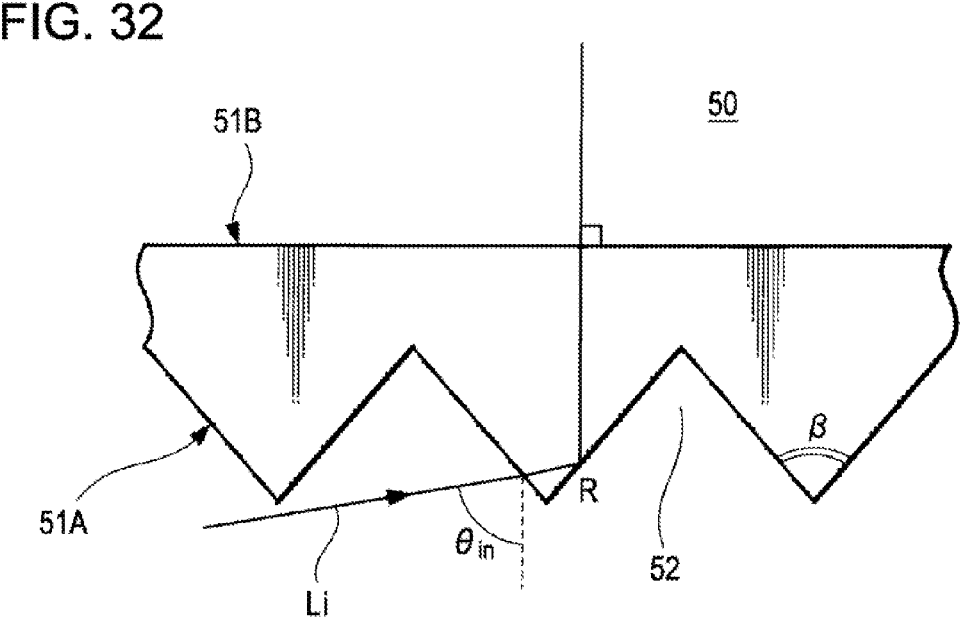
FIG. 32 is an exemplary view for illustrating Snell's law.

The condition to solve this is expressed by the following equation (2) from elementary geometric optics such as Snell's law:

$$n0 \times \cos(\theta in+\beta/2) = n \times \cos\{(3/2) \times \beta\} \quad (2)$$

where n0 denotes the refractive index of air; n the refractive index of the light deflecting sheet; θin incident angle of light incident in a slope of the concave structure 52 provided on the plane 51A of the light deflecting sheet 50 as shown in FIG. 32; and β the apex angle of the concave structure 52 to be required. As shown in FIG. 32, it is desirable that the light emitting angle from the back plane 51B be 0°.

When using the light deflecting sheet 50 for the backlight device, the incident angle of light is not one but the angles have a distribution; in this case, the peak value of the distribution may be used.

Also, in this case, for utilizing the total reflection within the sheet, i.e., the total reflection inside the slope of the concave structure 52 at point R shown in FIG. 32, it is desirable that the incident angle of emitting light be low, as shown by θin of FIG. 32. This angle is ranging 50°≦θin<90°, depending on the refractive index of the sheet.

Figure 33:
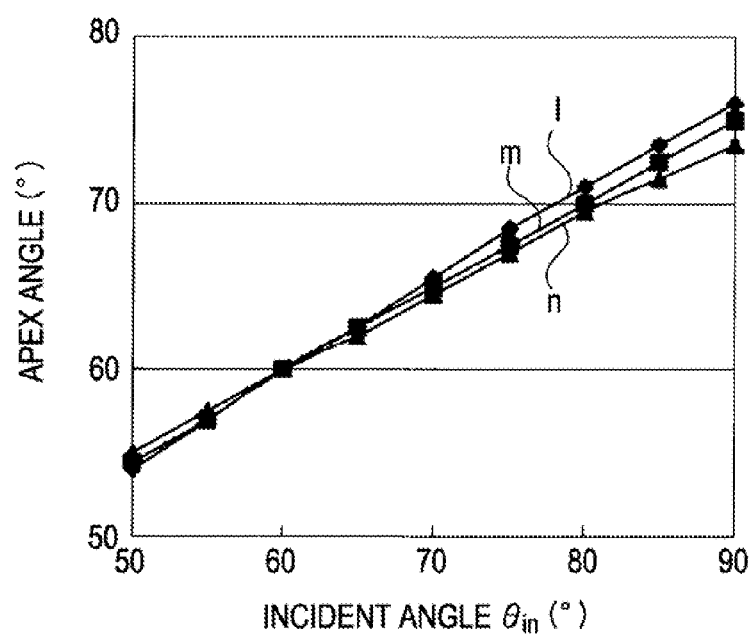
FIG. 33 is a drawing showing the relationship between the light incident angle and the apex angle θ of the concave structure provided in the light deflecting sheet.

Using the above equation (2), the relationship has been obtained between the incident angles (distribution peak values) of the light of typical materials and the apex angles θ when a quadrangular pyramidal concave structure is provided on the light deflecting sheet. The results are shown in FIG. 33. In FIG. 33, acryl with the refractive index 1.49 is designated as solid line 1; polycarbonate with refractive index 1.59 solid line m; and a high refractive index-material with the refractive index 1.7 solid line n.

From the results of FIG. 33, it is understood that over the comparatively broad refractive index range of 1.49 to 1.7, the apex angle θ of the concave structure optimal for the incident angle has a tendency not to differ largely.

On the other hand, it is understood that in the incident angle range of from 50° to 90°, the optimal apex angle θ simply increases.

When the light deflecting sheet according to the present invention is incorporated in the backlight device, the irradiating angle distribution of the light emitted from the LED light source can be adjusted by an LED lens. The light beam can be led from LED positions to over a broad region in the light guide plate especially when the side-emitting type LED, from which light is emitted sideway, is used. The irradiating angle distribution may frequently have a peak in between 50° and 90°.

Hence, when acryl is used for the material of the light deflecting sheet, it is understood that the apex angle of the quadrangular pyramidal concave structure may preferably be about 72°.

As an example, the angular distribution of light outputted from the light deflecting sheet has been analyzed when the LED with an irradiating angle set at about 80° and the light deflecting sheet according to the present invention is arranged. These results are shown in FIGS. 34A to 34F and FIGS. 35A to 35E. FIGS. 34A to 34F show the results when the apex angle θ is 20°, 40°, 60°, 66°, 72°, and 78°, respectively. FIGS. 35A to 35E show the results when the apex angle θ is 84°, 100°, 120°, 140°, and 160°, respectively. In each of all examples, solid line designates the angular brightness distribution on the surface of the light deflecting sheet in the horizontal direction (0°) and broken line designates that in the perpendicular direction (90°).

Figure 34A:
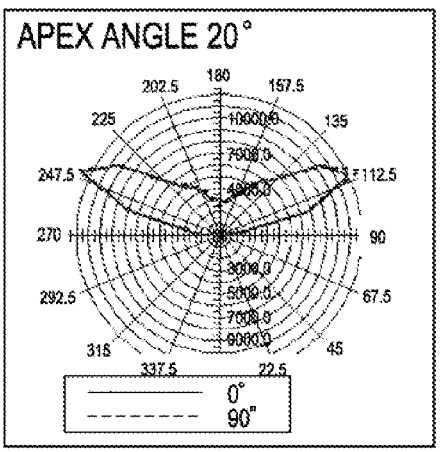
FIGS. 34A to 34F are drawings showing the angular brightness distribution of a light deflecting sheet according to an embodiment of the present invention.
Figure 34B:
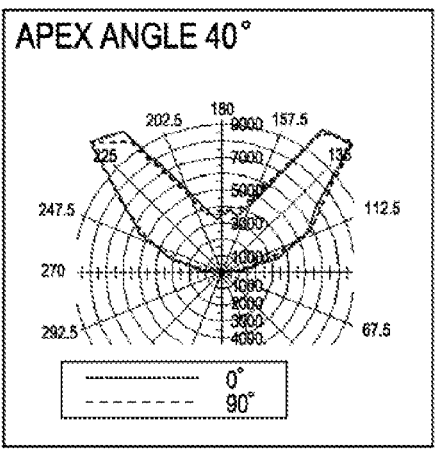
Figure 34C:
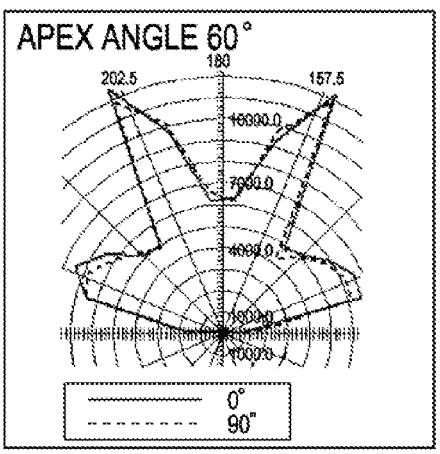
Figure 34D:
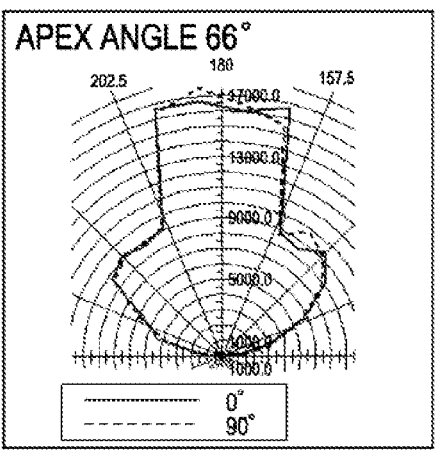
Figure 34E:
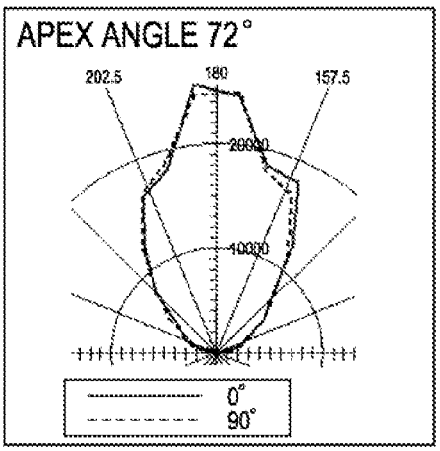

From these results, it is understood that when the apex angle θ is 72° as shown in FIG. 34E, the front brightness is maximum in both the horizontal and perpendicular directions. In the practical backlight device and liquid crystal display apparatus, since a structure expanding the angular brightness distribution, such as a diffusing plate, is provided, the angular brightness distribution may be broadened due to the effect of the structure, so that such an angular brightness distribution having directivity may be most suitable for the display apparatus.

Figure 34F:
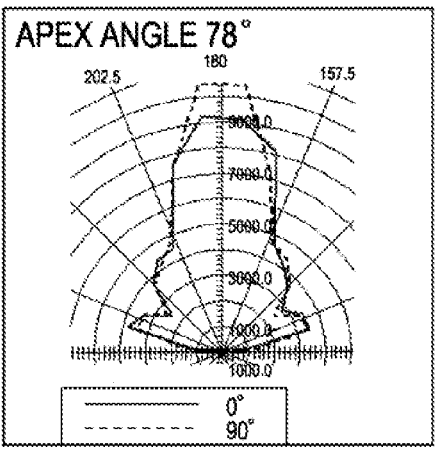
Figure 35A:
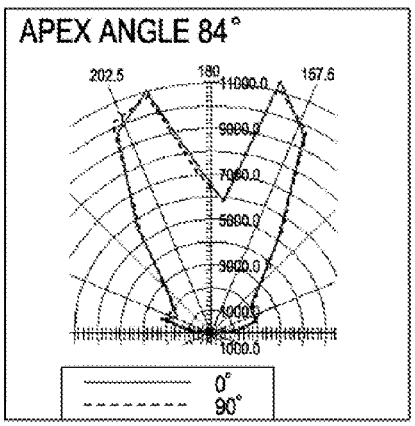
FIGS. 35A to 35E are drawings showing the angular brightness distribution of a light deflecting sheet according to an embodiment of the present invention.
Figure 35B:
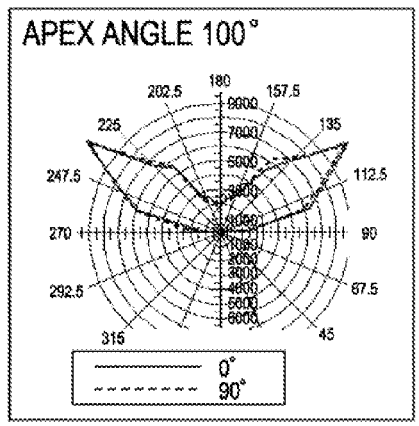
Figure 35C:
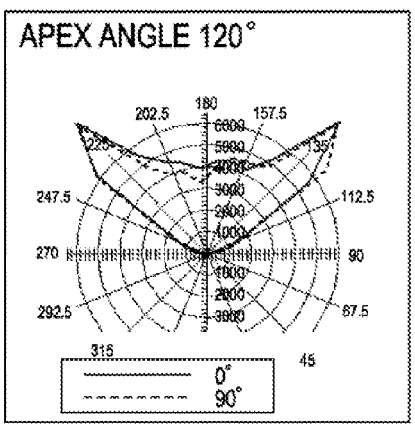
Figure 35D:
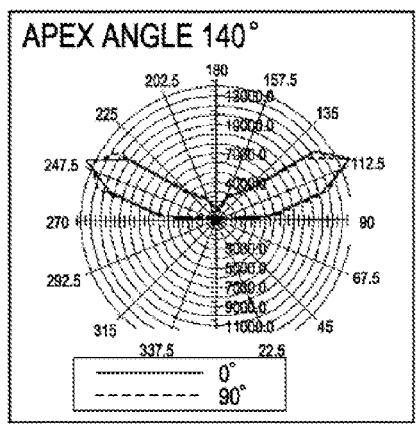
Figure 35E:
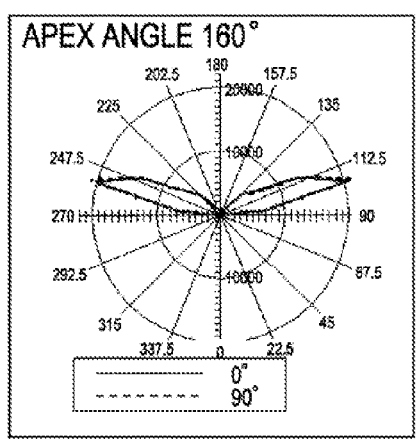
Figure 36A:
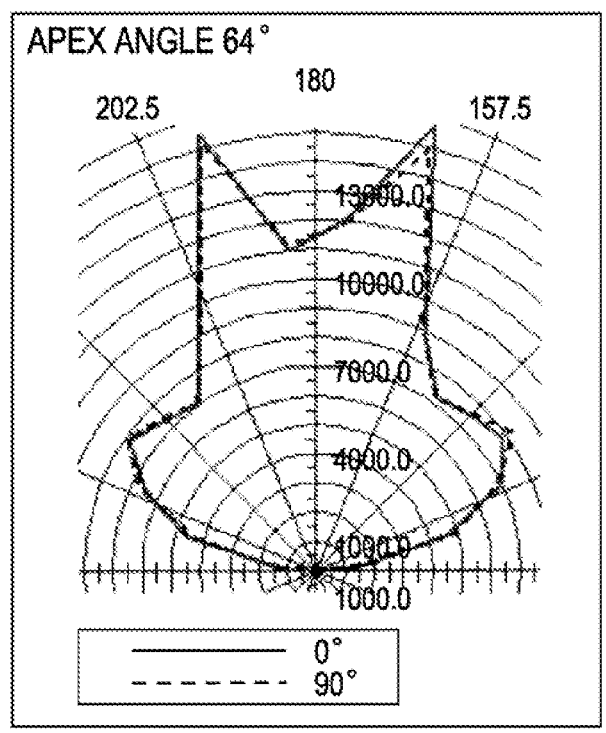
FIG. 36A is a drawing showing the angular brightness distribution of a light deflecting sheet according to an embodiment of the present invention.
Figure 36B:
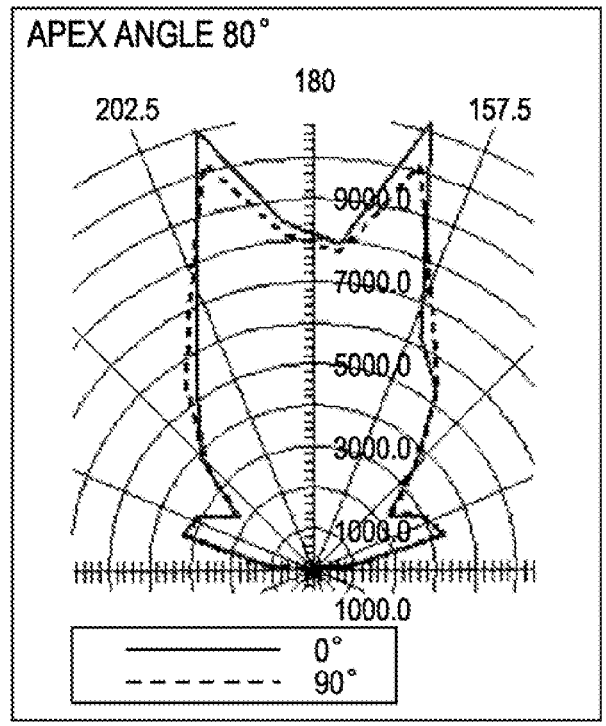
FIG. 36B is a drawing showing the angular brightness distribution of a light deflecting sheet according to an embodiment of the present invention.

In this case, the practical angular brightness distribution example includes an example of the apex angle 66° shown in FIG. 34D and an example shown in FIG. 34F of the apex angle ranging from 66° to 78° and including 78°. The angular brightness distributions at the apex angles of 64° and 80° are shown in FIGS. 36A and 36B, respectively. In these examples, the brightness in the front direction is reduced and the brightness peak is slanted, so that it is understood that these are unfavorable for the display apparatus.

From these results, when the light deflecting sheet is incorporated in the backlight device with the side-emitting type LED light source with a peak irradiating angle set at about 80° and the liquid crystal display apparatus including this backlight device, it is understood that when the apex angle of the concave structure of the light deflecting sheet ranges from 66° to 78°, the favorable angular brightness distribution can be obtained, optimizing the in-plane brightness distribution.

When the concave structure of the light deflecting sheet is quadrangular pyramidal, it is estimated that practically favorable angular brightness range can be obtained within the range ±6° of the optical apex angle θ to the light incident angle.

Figure 37:
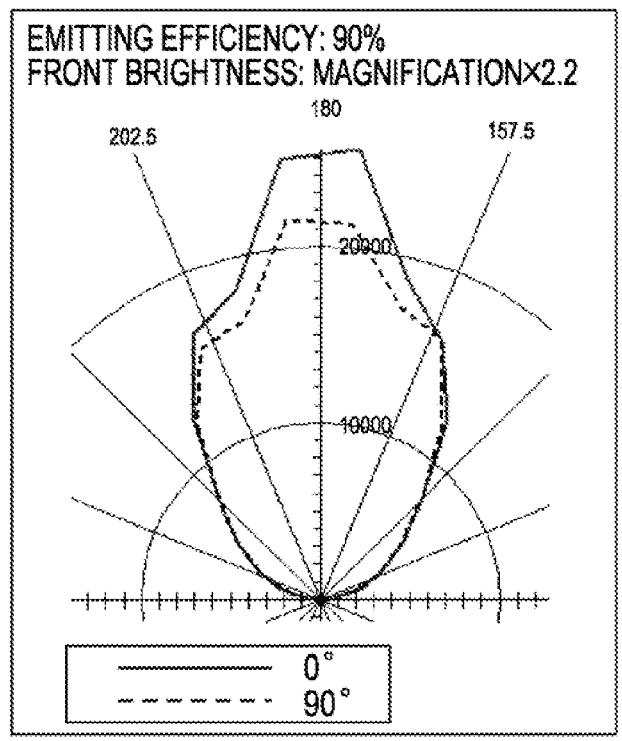
FIG. 37 is a drawing showing the angular brightness distribution of a light deflecting sheet according to an embodiment of the present invention.
Figure 38:
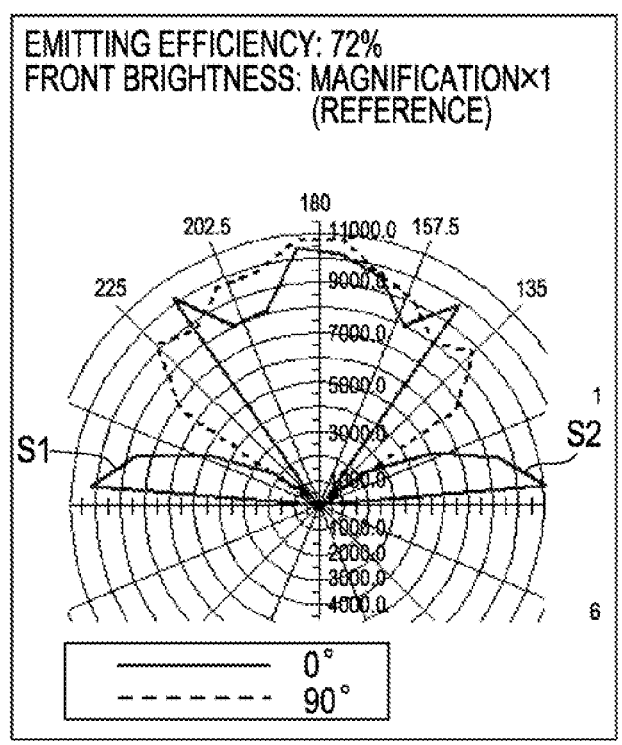
FIG. 38 is a drawing showing the angular brightness distribution of a light deflecting sheet of a comparative example.

Then, as comparative examples, the analyzed results of the angular brightness distribution are shown when the light deflecting sheet is made of the above-mentioned BEF™ (from Sumitomo 3M Limited) and DIAART™ (from MITSUBISHI RAYON Co., LTD). In FIG. 37, in the same way as in the example shown in FIG. 34E, a case is shown where the light deflecting sheet according to the present invention is used and its concave structure is a quadrangular pyramid with an apex angle of 72°. In FIG. 38, a case is shown where the above-mentioned BEF™ is used; and in FIG. 39, a case is shown where the above-mentioned DIAART™ is used. In each of the all examples, as an example of the backlight device shown in FIG. 40, the angular brightness distribution is shown when a plurality of side-emitting type LED light sources are arranged within a space; the reflection structures 22 are provided on the bottom plane and side faces; the light deflecting sheet 50 is arranged on the upper surface. In FIG. 37, a specular reflection sheet is used as the reflection structure 22; in FIGS. 38 and 39, a diffusing reflection sheet is used. In each of the all examples, the reflection factor is 97%. In also FIGS. 37 to 39, in the same way as in FIGS. 34 and 35, solid line designates the angular brightness distribution in the horizontal direction and broken line designates that in the perpendicular direction.

Figure 39:
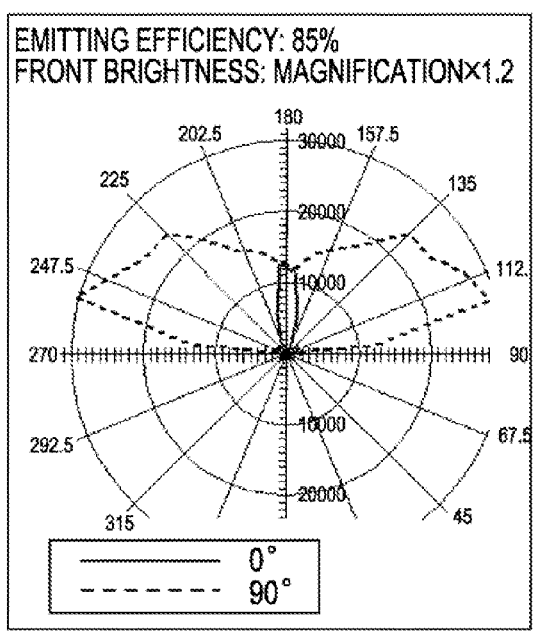
FIG. 39 is a drawing showing the angular brightness distribution of a light deflecting sheet of a comparative example.
Figure 40:
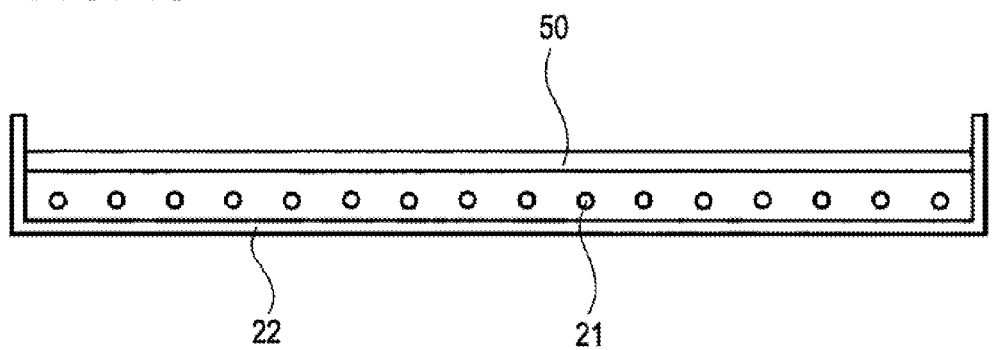
FIG. 40 is a schematic sectional structural drawing of an example of the backlight device.

As apparent from FIG. 37, when the light deflecting sheet shown in FIG. 29 is used, a light emitting efficiency is 90%; whereas, in examples in FIGS. 38 and 39, the efficiency are 72% and 85%, respectively, so that it is understood that the example shown in FIG. 37 is excellent in light emitting efficiency. As the front brightness is set 1 when the BEF shown FIG. 38 is used, in a case shown in FIG. 37, it is 2.2 times; in a case shown in FIG. 39, it remains to 1.2 times, so that it is understood that the front brightness is also the maximum in the example of FIG. 37.

From these results, it is understood that by using the light deflecting sheet shown in FIG. 29, the angular distribution of the brightness can be optimized, and especially when the light deflecting sheet is incorporated in the backlight device including the side-emitting LED, the front brightness can be doubled higher than a conventional configuration.

As shown in arrows S1 and S2 of FIG. 38, the light emitted extremely sideways, a so-called side lobe, is almost reflected or absorbed in vain when it is incident in the liquid crystal display panel of the liquid crystal display apparatus.

However, when the light deflecting sheet shown in FIG. 29 is used, such light outputted extremely sideways is avoided, so that an advantage that light availability can be sufficiently improved is obtained.

In each example mentioned above, the concave structures 52 are arranged at pitches of 50 μm. It is required for the pitch of the concave structure 52 to be a half of the wavelength of visible light or more, which is 0.2 μm. If the pitch is excessively large, the sheet is difficult to be produced by molding. If the thickness of the whole light deflecting sheet is excessively large, the in-plane distribution has non-uniformity, so that the thickness is preferably 500 mm or less. Also, the depth of the concave structure may become larger relative to the pitch depending on the apex angle, so that the pitch is desirable to be selected so that the depth of the concave structure becomes 50 mm or less.

In the examples mentioned above, the concave structure of the light deflecting sheet is roughly quadrangular pyramidal. In this case, the angle defined by inclines constituting the quadrangular pyramid is the same in both the lateral (horizontal) and vertical (perpendicular) directions of the sheet, so that when the sheet is incorporated in the liquid crystal display apparatus, the angular distribution of the brightness is substantially the same in both the horizontal and perpendicular directions of the display screen. From the results of FIGS. 34A to 34F and FIGS. 35A to 35E, it is also understood that the angular brightness distribution is roughly the same in both the horizontal and perpendicular directions, shown by solid line and broken line, respectively.

Whereas, in a display apparatus such as a TV receiver, it is rather preferable that the angular distribution of the brightness in the horizontal direction be wider than that in the perpendicular direction, i.e., the angle of field in the horizontal direction be wider than that in the perpendicular direction.

Accordingly, as shown in the following examples, the shape of the concave structure may also include a shape having proportions different in the lateral direction corresponding to the horizontal direction of the display apparatus from in the vertical direction corresponding to the perpendicular direction thereof.

Figure 41A:
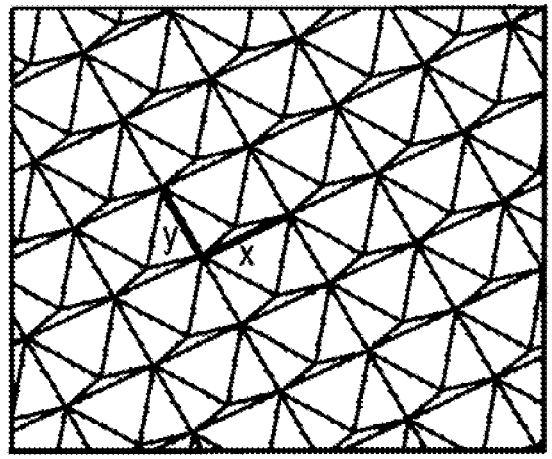
FIG. 41A is an enlarged perspective view of the surface of a light deflecting sheet according to an embodiment of the present invention.

When the concave structure is shaped in a quadrangular pyramid in the same was as in the examples mentioned above, an example in that its quadrangle on the opening is a regular square is shown in FIGS. 41A to 41D. FIG. 41A is an enlarged perspective view of the surface of the light deflecting sheet having such concave structures. For this case, when sides of the quadrangle on the opening are x and y, x=y.

Figure 41B:
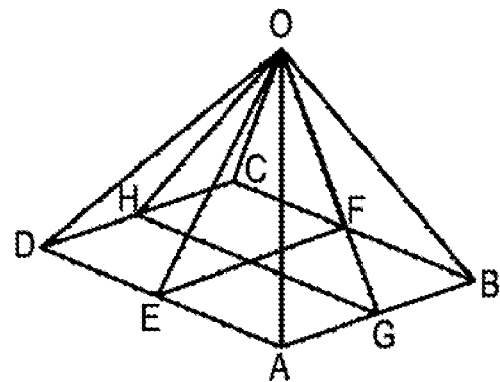
FIGS. 41B to 41D are geometric drawings for illustrating the shape of the concave structure of the light deflecting sheet according to the embodiment of the present invention.
Figure 41C:
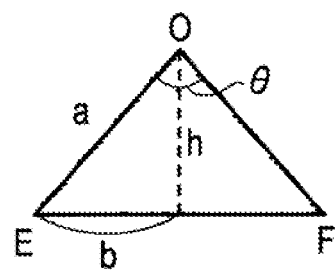
Figure 41D:
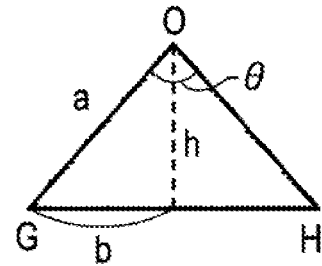

As shown in FIG. 41B, when the concave structure is shaped in a quadrangular pyramid having a square basal plane ABCD and an apex O, the triangle OEF formed by connecting the apex O to the midpoints E and F of the respective sides AD and BC and the triangle OHF formed by connecting the apex O to the midpoints G and H of the respective sides AB and CD are congruent with each other as respectively shown in FIGS. 41C and 41D.

That is, in the triangles OEF and OGH, the oblique line length a, half length b of the bottom line, and the height h are the same, respectively.

In the isotropic type configured in such a manner, the angular distribution of the brightness is substantially the same in both the horizontal and perpendicular directions as mentioned above.

Figure 42A:
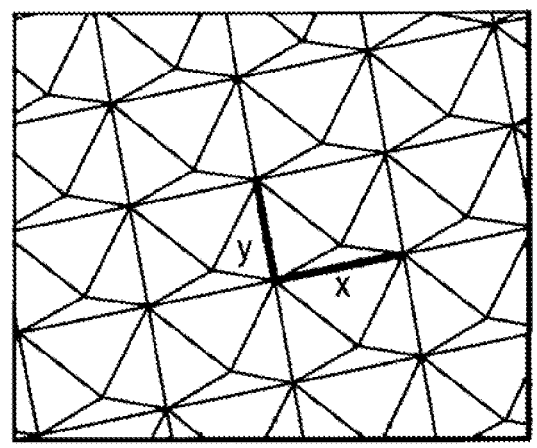
FIG. 42A is an enlarged perspective view of the surface of a light deflecting sheet according to an embodiment of the present invention.
Figure 43A:
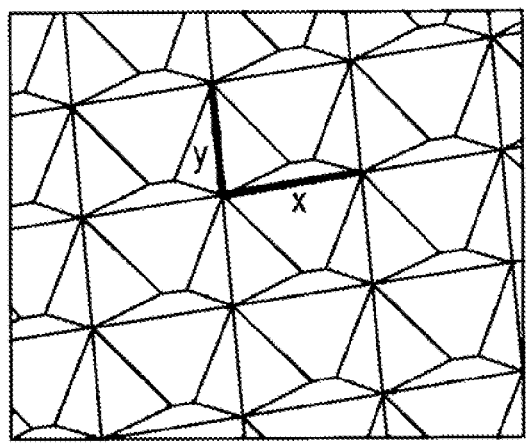
FIG. 43A is an enlarged perspective view of the surface of a light deflecting sheet according to an embodiment of the present invention.
Figure 43B:
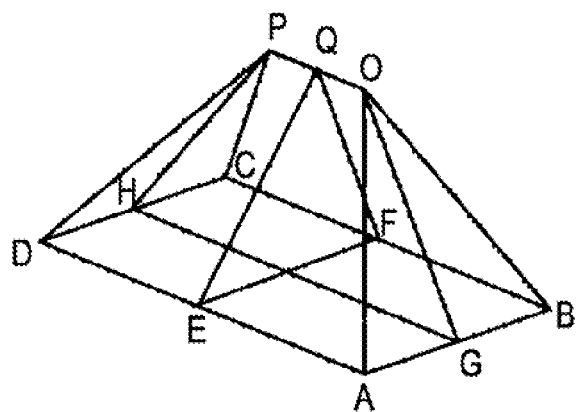
FIGS. 43B to 43D are geometric drawings for illustrating the shape of the concave structure of the light deflecting sheet according to the embodiment of the present invention.

On the other hand, as shown in enlarged perspective views of each example of the light deflecting sheet of FIGS. 42A and 43A, the concave structure may also be configured so that the angular distribution of the brightness differs in directions by x≠y, where sides of the basal plane of the concave structure are x and y, so that the apex angle differs regarding to extension directions of each side.

Figure 42B:
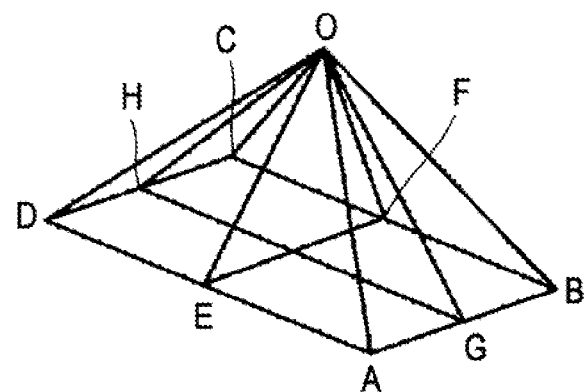
FIGS. 42B to 42D are geometric drawings for illustrating the shape of the concave structure of the light deflecting sheet according to the embodiment of the present invention.
Figure 42C:
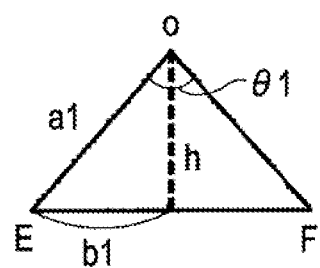
Figure 42D:
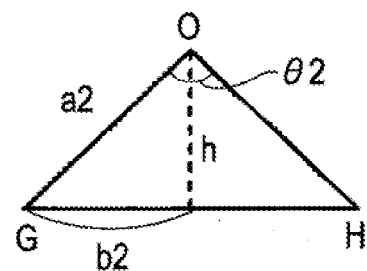

In examples shown in FIGS. 42A to 42D, the basal plane of the concave structure is shaped in a rectangular quadrangular pyramid. That is, as shown in FIG. 42B, the concave structure is formed by a rectangular quadrangular pyramid having the apex O and the rectangular basal plane ABCD. In the triangle OEF formed by connecting the apex O to the midpoints E and F of the respective sides AD and BC and the triangle OHF formed by connecting the apex O to the midpoints G and H of the respective sides AB and CD, as shown in FIGS. 42C and 42D, the apex angle θ1 is different from the apex angle θ2 (θ1<θ2); the oblique line length a1 is different from the oblique line length a2 (a1<a2); and half of the basal side length b1 is different from half of the basal side length b2 (b1<b2). However, the height h is the same.

By such a configuration, the angle of inclines constituting the concave structure is different in horizontal and perpendicular directions, so that a light deflecting sheet different in brightness in horizontal and perpendicular directions can be provided.

On the other hand, in the example shown in FIG. 43, the inclines constituting the concave structure are composed of two triangles and two trapezoids so that the angular distribution of the brightness differs in horizontal and perpendicular directions while the inclined angle of the incline being the same. In this case, as shown in FIG. 43B, the concave structure is constituted of the rectangular basal plane ABCD and inclines of triangles ABO and CDP formed by respectively connecting between sides AB/CD and apexes O/P, and trapezoids AOPD and BOPC formed by respectively connecting between sides AD/BC and the apexes O/P. The triangle QEF formed by respectively connecting between the respective midpoints E/F of the basal plane sides AD/BC and the midpoint Q of the edge line QP and the trapezoid GHOP formed by connecting between the midpoints G/H of the respective basal plane sides AB/CD and the edge line QP are shown in FIGS. 43C and 43D, respectively. In the triangle EFQ and the trapezoid GHOP, the height h is the same and the incline length a is also the same. When the apex angle of the triangle EFQ is θ, the angles defined by perpendicular lines dropped from the points Q/P of the edge line and the inclines are θ/2, respectively.

In this case, since the inclined angle of inclines in two directions is the same, when the light deflecting sheet is made of a resin material by molding, the mold can be comparatively simply manufactured, so that the advantage of securing yield is obtained. This is because when the mold is machined by cutting with a cutting tool, the shapes in both X- and Y-axial directions may be cut with the same tool so that no different tool in shape is needed.

Figure 43C:
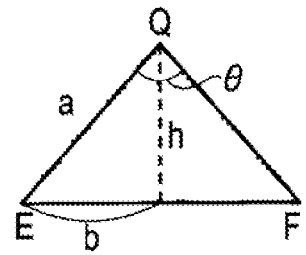
Figure 43D:
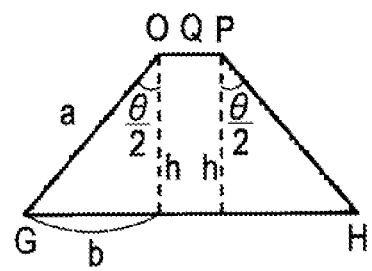

For the configuration described with reference to FIGS. 43A to 43D, the angular brightness distribution has been analyzed by setting the angle of the apex Q of the triangle EFQ shown in FIG. 43C at 72° and by changing the length ratio GH/EF between the bottom side GH of the trapezoidal shown in FIG. 43D and the bottom side EF of the triangle EFQ. The results are shown in FIGS. 44A to 44F.

In FIGS. 44A to 44F, the bottom-side ratio GH/EF between the trapezoidal and the triangle is changed to be 1, 1.25, 1.5, 2, 3, and 5. It is understood that in comparison with FIG. 44A, the angular brightness distribution in the horizontal direction (0°) designated by solid line is different from that in the perpendicular direction (90°).

Thus, the light deflecting sheet may be configured by selecting the shape of the concave structure in accordance with characteristics of a display apparatus to be used for obtaining the optimal angular brightness distribution.

In each example described above, the concave structure of the light deflecting sheet is shaped in a quadrangular pyramid or a shape constituted of two triangular inclines and two trapezoidal inclines; however, the concave structure may be shaped in any shape as long as the shape includes an incline with an angle adapted to incident light, so that various other shapes, such as a circular cone, a pentangular pyramid, a hexagonal pyramid, and more multi-angular pyramids than the hexagonal pyramid, may be adopted.

Then, an example of a transmission liquid crystal display apparatus incorporating the backlight device according to the present invention will be described with reference to the schematic structural drawing of FIG. 45.

Figure 45:
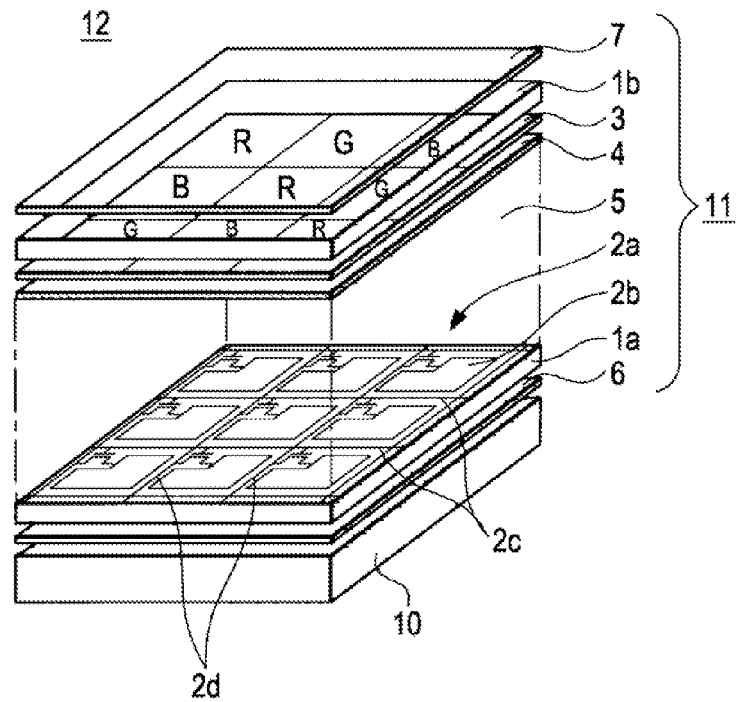
FIG. 45 is a schematic exploded perspective structural drawing of an example of a liquid crystal display apparatus according to the present invention.

As shown in FIG. 45, a transmission liquid crystal display apparatus 12 includes a transmission liquid crystal display panel 11 and a backlight device 10 provided on the back side of the liquid crystal display panel 11. Although not shown, the liquid crystal display apparatus 12 may include a receive section for receiving ground waves and satellite waves, such as an analog tuner and a digital tuner, a picture signal processor/a sound signal processor for processing picture and sound signals received by the receive section, respectively, and a sound signal output section for outputting the sound signal processed by the sound signal processor such as a speaker.

In this example, an active matrix drive system liquid crystal display apparatus is provided in that on a first substrate 1a made of glass, a thin film transistor (TFT) 2a for selecting each pixel every pixel and a pixel electrode 2b connected to the drain region of the TFT 2a are formed. In boundaries between pixels, a gate bus line 2c connected to the gate electrode of the TFT 2a and a source bus line 2d connected to the source region of the TFT 2a are formed in a grid pattern so as to connect pixels together.

On the other hand, on a second substrate 1b made of glass, three-color color filters 3 of R (red), G (green), and B (blue) are alternately formed every pixel. On the color filters 3, a common electrode 4 integrated with a plurality of pixels is formed. Although only 3 pixels×3 pixels=9 pixels are shown in FIG. 45, the color filters 3 are provided so as to display m pixels×n pixels in practice. The first substrate 1a and the second substrate 1b are arranged in parallel with each other with a predetermined gap therebetween so that the pixel electrode 2b opposes the common electrode 4. A space between the obtained pixel electrode 2b and the common electrode 4 is filled with liquid crystal 5 so as to be pinched between liquid crystal alignment films (not shown).

Furthermore, on the back plane of the surface of the first substrate 1a to be formed by the pixel electrode 2b, a polarizing plate 6 and the backlight device 10 irradiating white light are arranged. Also, on the back plane of the surface of the second substrate 1b to be formed by the common electrode 4, a polarizing plate 7 is arranged.

Figure 46:
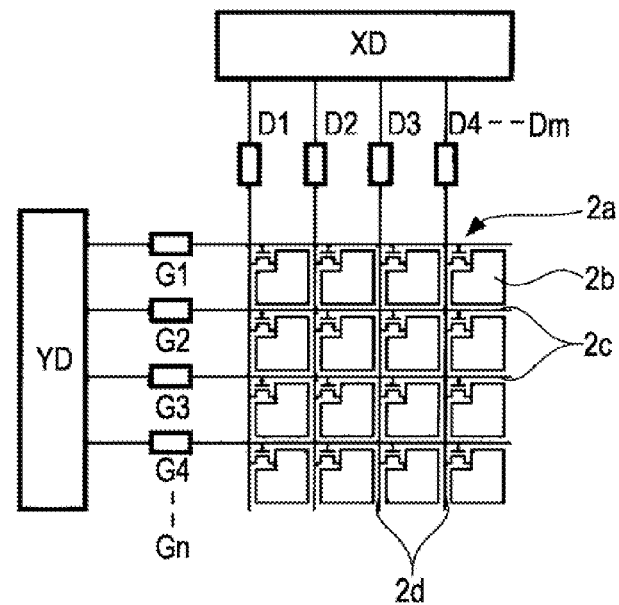
FIG. 46 is a schematic structural drawing of the essential part of an example of the liquid crystal display apparatus according to the embodiment of the present invention.
Figure 47:
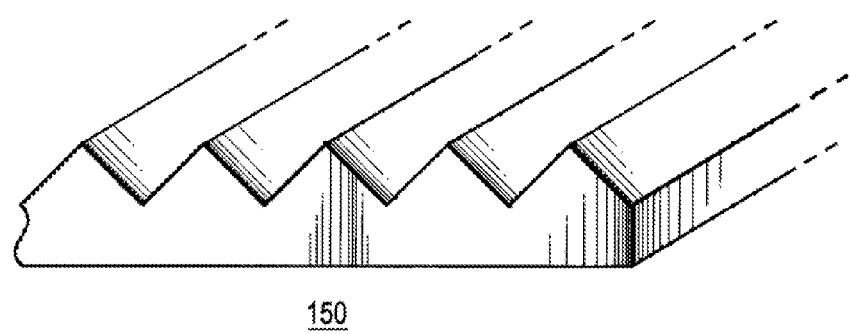
FIG. 47 is a schematic perspective view of an example of a conventional light deflecting sheet.
Figure 48:
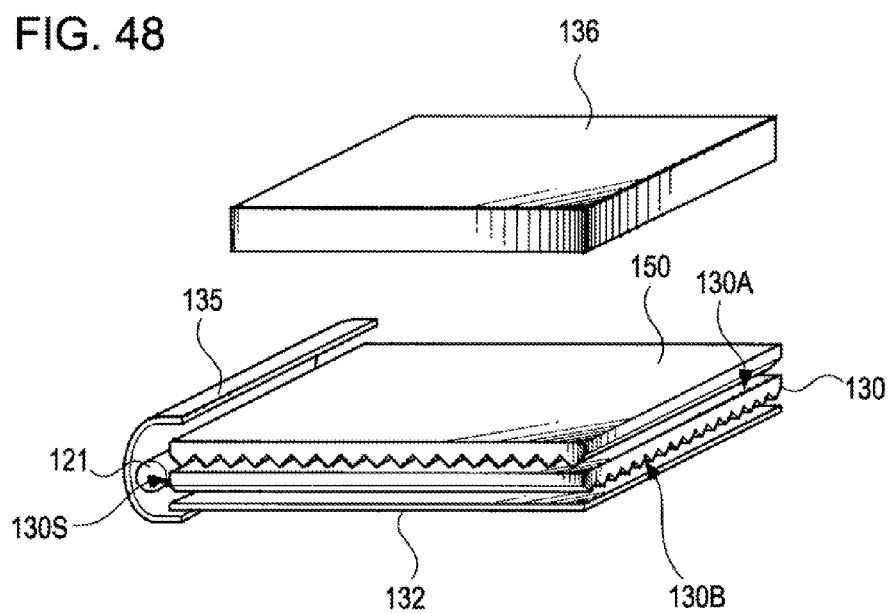
FIG. 48 is a schematic exploded perspective structural drawing of an example of a conventional light deflecting sheet.

FIG. 46 is an arrangement drawing of liquid crystal drive electrodes and TFTs. Although 4 pixels×4 pixels=16 pixels are shown on the drawing, they are arranged to display m pixels×n pixels in practice. As mentioned above, on one surface of the first substrate 1a, the TFT 2a and the pixel electrode 2b are arranged every pixel and in boundaries between pixels, the gate bus lines 2c and the source bus lines 2d are formed in a grid pattern. In an exterior frame of the liquid crystal screen, liquid crystal drive drivers including an X driver XD and a Y driver YD are arranged. The gate bus lines 2c are connected to the Y driver YD via selection circuits G1 to Gn, respectively. On the other hand, the source bus lines 2d are connected to the X driver XD via selection circuits D1 to Dm, respectively.

The active-element TFT 2a herein connects or disconnects between the pixel electrode 2b applying an electric field to the liquid crystal 5 and the source bus line 2d, which is a data electrode, in accordance with a signal of the gate bus line 2c, which is a scanning electrode bus, so as to selectively drive the liquid crystal of each pixel. The light emitted from the backlight device 10 and passed through the polarizing plate 6 is transmitted through the liquid crystal 5 while transmittance being controlled by a liquid crystal section selected by the selection circuit. Furthermore, it is transmitted through the each-color color filters 3 and the polarizing plate 7 so as to form color images on the side of the polarizing plate 7. Thereby, a high image-quality liquid crystal display is achieved with high contrast and high-speed response.

In the example described above, the active matrix drive system liquid crystal display apparatus has been provided; however, the backlight device and the liquid crystal display apparatus according to the present invention may be obviously applicable to other liquid crystal display apparatuses such as a simple matrix drive system liquid crystal display apparatus.

The liquid crystal display apparatus according to the present invention may be incorporated in the backlight device according to each embodiment of the present invention. The backlight device may not be provided with the diverter sheet or the diffusing sheet mentioned above depending on light source characteristics such as angular distribution. The backlight device may also not necessarily be provided with the BEF™ (from Sumitomo 3M Limited) and DIAART™ (from MITSUBISHI RAYON Co., LTD) used in a conventional liquid crystal display apparatus.

As described above, according to the backlight device and the liquid crystal display apparatus of the present invention, the light guide plate includes a hole or a projection formed on the light outgoing plane or the back plane opposing the light-outgoing plane, and a side face of the hole or the projection is directed roughly perpendicularly to the light-outgoing plane or the back plane, so that in the hole or the projection, light is led to within the light guide plate while its reflection angle being maintained, and then it can be outputted from the light guide plate with desired angular brightness distribution. Hence, the thickness of the entire illumination apparatus having the backlight device with the light guide plate and the thickness of the liquid crystal display apparatus, such as the thickness between the reflection structure arranged on the back plane of the light guide plate and the liquid crystal display panel, can be reduced.

By forming at least one opening in the light guide plate so as to accommodate the light source therein, the angular distribution from the light source is maintained more securely so as to output light from the light guide plate, avoiding or suppressing the reduction in light availability.

Furthermore, the side face of the hole or the projection provided in the light guide plate has a function to totally reflect almost entire light emitted from the nearest light source, so that the light can be led for a longer time to satisfactorily mix the light, thereby using a light source with comparatively large unevenness.

The cross-sectional shape of the hole or the projection provided in the light guide plate may be a circle or an ellipse, and the cross-sectional shape of the hole or the projection may also be a polygon, so that the angular distribution of the light from the light source may be preferably provided.

The angular distribution of the light from the light source may be more preferably provided especially when the cross-sectional shape of the hole or the projection provided in the light guide plate is a square.

When the shapes of the holes or the projections provided in the light guide plate are all the same, the brightness non-uniformity and chromaticity can be uniformised with a comparatively simple configuration.

Furthermore, when the light guide plate is provided with a reflection structure composed of a specular reflection member arranged on at least one side of the side faces of the light guide plate, the reflection angle of the light led to within the light guide plate is maintained so as to preferably mix the light, maintaining the angular distribution of the light from the light source.

Also, when shapes of a plurality of the holes or the projections arranged on the light guide plate are selected in accordance with the position from the light source so that the light emitted from the light source is difficult to be outside derived in the vicinity of the light source while the light emitted from the light source is easily outside derived at a comparatively distant place from the light source, light may be preferably mixed even when the arrangement of the light sources is not uniform, enabling the angular distribution to be maintained.

Furthermore, when the light source is a light emitting diode, the arrangement of light sources may be freely selected so as to suppress the brightness non-uniformity.

Also, when the light source is a light source emitting multi-color light, color reproduction can be improved.

When the light source includes a light source having strong intensity distribution in a lateral direction, and a light deflecting sheet outputting incident light having a specific angular distribution with angular brightness distribution having a peak in a specific direction is used together, light can be outputted in a more desired direction.

When the opening for arranging the light source therein has a columnar shape with side faces directed roughly perpendicularly to the light-outgoing plane of the light guide plate and the upper face roughly parallel thereto, light can be led to within the light guide plate from the opening for the light source while the angular distribution being substantially maintained.

Also, when a light deflecting sheet is arranged on the light-outgoing plane of the light guide plate, and the light deflecting sheet outputs incident light having a specific angular distribution, with the angular brightness distribution including a peak in a specific direction relative to the light-outgoing plane of the light deflecting sheet, a backlight device that can emit light outside with a desired angular brightness distribution can be provided.

Also, when the light deflecting sheet is configured by juxtaposing pyramidal concave structures or concave structures with two triangular inclines and two trapezoidal inclines at least on the light-outgoing plane, light can be securely outputted in a desired direction with high availability by a comparatively simple configuration.

When the apex angle of the pyramidal concave structure ranges from 66° to 78°, the backlight device can be provided which can emit light roughly in the front direction using the light source with angular distribution having a main peak at 80°.

Similarly, when the angle defined by two trapezoids constituting the concave structure ranges from 66° to 78°, the backlight device can be provided which can emit light roughly in the front direction using the light source with angular distribution having a main peak at 80°.

According to the light deflecting sheet of the present invention, the light deflecting sheet can output incident light outputted from the light guide plate with angular distribution so as to have angular brightness distribution with a peak in a desired direction, the front direction, for example, thereby reducing the returned light amount and improving the brightness. Moreover, even when comparatively large unevenness in flux amount of an individual LED and wavelength distribution, the brightness non-uniformity of the light emitted from the backlight device can be suppressed.

Even when the light source itself having no directivity of the radiation angle is used, as long as the entire system has the angular distribution with strong directivity with the structure between the light source and the light deflecting sheet before light enters the light deflecting sheet, the backlight device having desired angular brightness distribution can be provided using the light deflecting sheet configured as described above.

As described above, by regulating the angular brightness distribution to have a peak in the front direction of the display apparatus or by appropriately controlling the balance between the angular brightness distribution in the horizontal direction and that in the perpendicular direction as well as by reducing the returned light amount, light can be emitted with higher brightness than before.

Furthermore, by adjusting the shape, such as the apex angle, of the concave structure provided in the light deflecting sheet, or by changing the refractive index of the material of the light deflecting sheet, the angular brightness distribution and the returned light amount can be controlled as mentioned above. Namely, by appropriately shaping the concave structure of the light deflecting sheet in accordance with the angular distribution from the light source so as to reduce the returned light and the loss in the reflection structure, the overall brightness is improved to have the outputted light with optimal angular brightness distribution. Since light absorption by the reflection plate due to the returned light can be suppressed, heat generation is also suppressed.

A diffusing plate is generally provided, which opposes the light source with a predetermined space therebetween, for diffusing light. When the light guide plate is provided, such a diffusing plate is provided on the light outgoing plane of the light guide plate. Alternatively, in order to convert the light two-dimensionally emitted from the backlight device into the illumination light having optical characteristics most suitable for illuminating the liquid crystal display panel, an optical sheet group is provided that includes a sheet having a function to divide incident light into polarized components orthogonal to each other, a sheet having a function to compensate the phase difference of light waves for widening the visual field and preventing the coloration, a sheet having a function to diffuse incident light, and a sheet having a function to improve the brightness. The optical sheet group may include the diffusing sheet, a prism sheet, and a polarization conversion sheet.

In the liquid crystal display apparatus having the backlight device according to the present invention, by providing the light deflecting sheet configured as described above, the backlight device 10 can be configured to emit light to the liquid crystal display panel 11 shown in FIG. 45 with preferable angular brightness distribution, enabling the device thickness to be reduced.

That is, the distance between the light source and the diffusing plate has been required to be comparatively large; however, this portion can be reduced in thickness, thereby reducing the thickness of the liquid crystal display apparatus having the backlight device and the thickness of various illumination apparatuses including the backlight device.

A diffusing sheet and a polarization conversion sheet may be provided on the upper surface of the backlight device if necessary.

As mentioned above, in the backlight device including the three-primary color light emitting diodes, it is important to increase the brightness in any manner while the in-plane brightness distribution is being uniformised, i.e., the color mixture and the light intensity distribution are being uniformised.

As described above, according to the present invention, a hole or a projection is provided on the light guide plate; as shown in FIGS. 29 and 41 to 43, the light deflecting sheet is provided that outputs light with a specific angular brightness distribution so as to have a specific angular brightness distribution by polarization; and the light deflecting sheet adaptable for the distribution is used, in which the light emitted from the light source is incident with sharp angular distribution maintained, so that the in-plane brightness distribution is uniformised and the color mixture and the light intensity distribution are uniformised as well as the light emitting efficiency of the display apparatus is improved, thereby improving the brightness.

In particular, in the backlight device described above, the side-emitting type light emitting diode is used for the light source; the concave structure of the light deflecting sheet is shaped in a pyramid so as to have an apex angle of 66° to 78°, so that the liquid crystal display apparatus with appropriate angular brightness distribution and the brightness markedly improved than before can be provided.

The present invention is not limited to the examples described above, so that various modifications can be obviously made within the scope of the invention in the material, the structure, and the arrangement of the light deflecting sheet.

For example, when unevenness or distribution in the angular distribution is generated on the incident plane of the light deflecting sheet due to the structure between the light deflecting sheet and the light source, the light guide plate, or the other light source, the apex angle of the concave structure of the light deflecting sheet may also be shaped to have a distribution by corresponding to the unevenness or distribution.

Also, in the example described above, the shapes of concave structures on the light deflecting sheet are uniformised and the concave structures are formed on the sheet without gaps; when the concave structures are formed without gaps in such a manner, the brightness can be more securely improved. In addition to the square, the pyramidal concave structures with the regular hexagonal bottom surface may also be provided without gaps. However, even when small flat portions exist at least in part of portions between the concave structures, the brightness can be improved by optimizing the angular brightness distribution.

Moreover, the light deflecting sheet, the backlight device, and the liquid crystal display apparatus according to the present invention are not limited to the examples described above, so that various other modifications and changes can be made within the scope of the invention.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A backlight device comprising a light guide plate and at least one light source so that light is outputted outside from a light-outgoing plane of the light guide plate,
    wherein the light guide plate includes a hole or a projection formed on the light outgoing plane or the back plane opposing the light-outgoing plane, and a side face of the hole or the projection is directed roughly perpendicularly to the light-outgoing plane or the back plane,
    wherein for each light source, the light source is accommodated in an opening formed in the light guide plate, and
    wherein the hole or projection is provided in addition to the opening.

2. The backlight device according to claim 1, wherein the side face of the hole or the projection provided on the light guide plate has a function to totally reflect almost entire light emitted from the nearest light source.

3. The backlight device according to claim 1, wherein the cross-sectional shape of the hole or the projection provided on the light guide plate is a circle or an ellipse.

4. The backlight device according to claim 1, wherein the cross-sectional shape of the hole or the projection provided on the light guide plate is a polygon.

5. The backlight device according to claim 1, wherein the cross-sectional shape of the hole or the projection provided on the light guide plate is a square.

6. The backlight device according to claim 1, wherein the shapes of the holes or the projections provided in the light guide plate are all the same.

7. The backlight device according to claim 1, wherein the light guide plate is provided with a reflection structure composed of a specular reflection member arranged on at least one side of the side faces of the light guide plate.

8. The backlight device according to claim 1, wherein shapes of a plurality of the holes or the projections arranged on the light guide plate are selected in accordance with the position from the light source so that the light emitted from the light source is difficult to be outside derived in the vicinity of the light source while the light emitted from the light source is easily outside derived at a comparatively distant place from the light source.

9. The backlight device according to claim 1, wherein the light source is a light emitting diode.

10. The backlight device according to claim 1, wherein the light source is a light source emitting multi-color light.

11. The backlight device according to claim 1, wherein the light source includes a light source having strong intensity distribution in a lateral direction.

12. The backlight device according to claim 11, wherein the ratio L/H of the height H of the projection provided on the light guide plate to the length L of the cross-section of the projection is:

$L/H \geq \tan \alpha$, where α denotes an angle at which the light amount emitted from the light source having strong intensity distribution in a lateral direction is reduced to 25% of that at the main peak angle.

13. The backlight device according to claim 8, wherein the opening for arranging the light source therein has a columnar shape with side faces directed roughly perpendicularly to the light-outgoing plane of the light guide plate and the upper face roughly parallel thereto.

14. The backlight device according to claim 1, further comprising a light deflecting sheet arranged on the light-outgoing plane of the light guide plate,
wherein the light deflecting sheet outputs incident light having a specific angular distribution to have the angular brightness distribution including a peak in a specific direction relative to the light-outgoing plane of the light deflecting sheet.

15. The backlight device according to claim 14, wherein the light deflecting sheet is configured by juxtaposing pyramidal concave structures or concave structures with two triangular inclines and two trapezoidal inclines at least on the light-outgoing plane.

16. The backlight device according to claim 15, wherein the apex angle the pyramidal concave structure ranges from 66° to 78°.

17. The backlight device according to claim 15, wherein the angle defined by the two trapezoids constituting the concave structure ranges from 66° to 78°.

18. A liquid crystal display apparatus comprising a transmission liquid crystal display panel and a backlight device for illuminating the liquid crystal display panel from the back side,
wherein the backlight device includes a light guide plate and at least one light source assembled in the light guide plate, and
wherein the light guide plate is provided with a hole or a projection formed on a light-outgoing plane of the light guide plate or the back plane opposing the light-outgoing plane, and a side face of the hole or the projection is directed roughly perpendicularly to the light-outgoing plane or the back plane, wherein for each light source, the light source is accommodated in an opening formed in the light guide plate, and
wherein the hole or projection is provided in addition to the opening.

19. The liquid crystal display apparatus according to claim 18, further comprising a light deflecting sheet provided on the light outgoing plane of the light guide plate,
wherein the light deflecting sheet outputs incident light having a specific angular distribution with angular brightness distribution having a peak in a specific direction.

20. A light deflecting sheet arranged on a light outgoing plane of a light guide plate, the light deflecting sheet mixing light from a light source so as to derive the light outside and comprising pyramidal concave structures or concave structures with two triangular inclines and two trapezoidal inclines, the concave structures being juxtaposed at least on the light-outgoing plane wherein the apex angle of the pyramidal concave structure or the angle defined by two trapezoids constituting the concave structure ranges from 66° to 78°.

* * * * *